US012664353B2

(12) United States Patent
Smithline

(10) Patent No.: US 12,664,353 B2
(45) Date of Patent: Jun. 23, 2026

(54) SYSTEM-GUIDED COLLABORATIVE EDITING OF STANDARDIZED DOCUMENTS

(71) Applicant: Bonterms, Inc., San Francisco, CA (US)

(72) Inventor: Todd Smithline, San Francisco, CA (US)

(73) Assignee: Bonterms, Inc., San Francisco, CA (US)

( * ) Notice: Subject to any disclaimer, the term of this patent is extended or adjusted under 35 U.S.C. 154(b) by 463 days.

(21) Appl. No.: 18/341,106

(22) Filed: Jun. 26, 2023

(65) Prior Publication Data

US 2024/0289537 A1      Aug. 29, 2024

Related U.S. Application Data

(60) Provisional application No. 63/448,725, filed on Feb. 28, 2023.

(51) Int. Cl.
*G06F 40/166*      (2020.01)
*G06Q 10/101*      (2023.01)

(52) U.S. Cl.
CPC ......... *G06F 40/166* (2020.01); *G06Q 10/101* (2013.01)

(58) Field of Classification Search
CPC ............................ G06F 40/166; G06Q 10/101
USPC ..................................................... 715/726, 256
See application file for complete search history.

(56) References Cited

U.S. PATENT DOCUMENTS

| | | | | |
|---|---|---|---|---|
| 2006/0253449 | A1* | 11/2006 | Williamson .......... | G06F 40/166 |
| | | | | 707/999.009 |
| 2020/0410617 | A1* | 12/2020 | Wichern .............. | G06Q 50/188 |
| 2021/0150653 | A1* | 5/2021 | Hjertstedt ............. | G06F 40/166 |
| 2022/0229978 | A1* | 7/2022 | Ship ........................ | G06F 40/40 |

* cited by examiner

*Primary Examiner* — Stephen S Hong
*Assistant Examiner* — Broderick C Anderson

(57) ABSTRACT

According to techniques described herein, a system/platform may implement a method for collaboratively editing a standardized text document. The platform may receive a user selection of a standardized text document, receive a first party set of values, receive a second party set of values, execute an algorithm for generating a final set of values for the standardized text document, and transmit the final set of values to the first party and the second party.

20 Claims, 10 Drawing Sheets

110

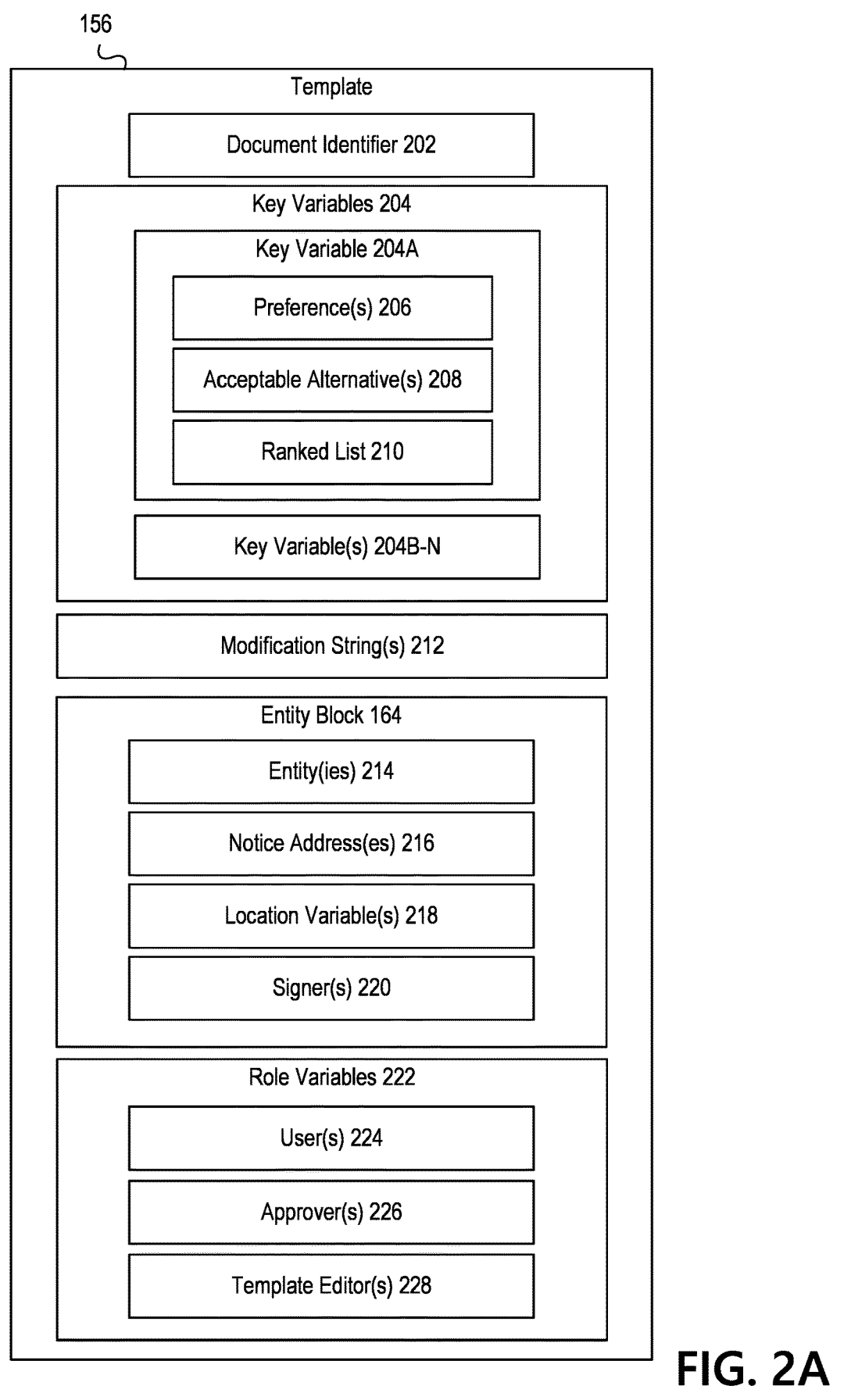

156

Template

Document Identifier 202

Key Variables 204

Key Variable 204A

Preference(s) 206

Acceptable Alternative(s) 208

Ranked List 210

Key Variable(s) 204B-N

Modification String(s) 212

Entity Block 164

Entity(ies) 214

Notice Address(es) 216

Location Variable(s) 218

Signer(s) 220

Role Variables 222

User(s) 224

Approver(s) 226

Template Editor(s) 228

FIG. 2A

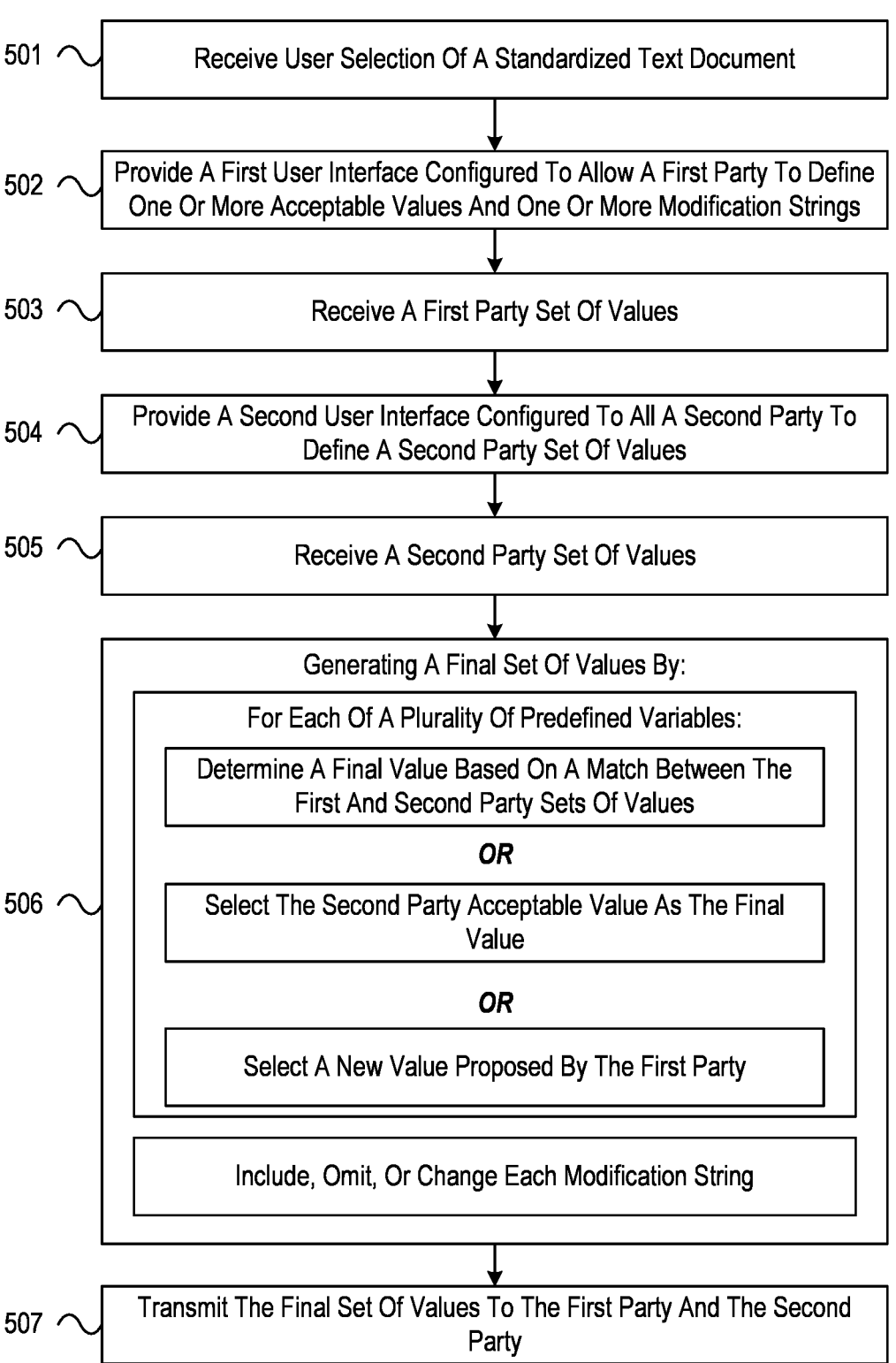

501 — Receive User Selection Of A Standardized Text Document

502 — Provide A First User Interface Configured To Allow A First Party To Define One Or More Acceptable Values And One Or More Modification Strings 503 — Receive A First Party Set Of Values 504 — Provide A Second User Interface Configured To All A Second Party To Define A Second Party Set Of Values 505 — Receive A Second Party Set Of Values 506 — Generating A Final Set Of Values By:

For Each Of A Plurality Of Predefined Variables:

Determine A Final Value Based On A Match Between The First And Second Party Sets Of Values

*OR*

Select The Second Party Acceptable Value As The Final Value

*OR*

Select A New Value Proposed By The First Party

Include, Omit, Or Change Each Modification String

507 — Transmit The Final Set Of Values To The First Party And The Second Party

FIG. 5

SYSTEM-GUIDED COLLABORATIVE EDITING OF STANDARDIZED DOCUMENTS

PRIORITY CLAIM

This application claims priority to U.S. provisional patent application No. 63/448,725, filed Feb. 28, 2023, the entirety of which is herein incorporated by reference.

FIELD

The present disclosure relates to the field of text processing, and more specifically to collaborative editing of standardized text documents.

BACKGROUND

Conventional processes for collaboratively editing documents (e.g., for negotiating an agreement, for drafting a plan or proposal involving multiple stakeholders, or for any other purpose involving multiple authors/editors) are often unstructured and inefficient. One party may start from scratch or with a template and then add or modify text. Then, another party may add different text, edit the first party's text, delete any text, or make any other changes. The first party or other parties may then change any or all of the material, add new material, or otherwise modify text in an open-ended manner. As a result, it may take a significant amount of time to finish collaborative editing and settle on a final document. Along the way, much effort may be wasted as material may be added, changed, deleted, re-added, all of which information has to be tracked and interpreted by each party.

These inefficiencies collectively cost a significant amount of time and effort, delaying progress on finalizing important documents and discouraging collaboration. As such, better and more efficient methods of collaborative editing are highly desired and useful.

SUMMARY

The following presents a simplified summary of various aspects described herein. This summary is not an extensive overview, and is not intended to identify key or critical elements. Corresponding systems and computer-readable media are also within the scope of the disclosure.

According to techniques described herein, a system/platform may implement a method for collaboratively editing a standardized text document. The platform may receive by a user selection of a standardized text document for collaborative editing, wherein the standardized text document includes a plurality of predefined variables, wherein the standardized text document is stored in a library of standardized text documents maintained by the platform. The platform may provide a first user interface configured to allow a first party to define one or more acceptable values for each of the plurality of predefined variables and to define one or more modification strings for modifying the standardized text document. The platform may receive a first party set of values for the selected standardized text document, wherein the first party set of values comprises at least one first party acceptable value for each of the plurality of predefined variables; and at least one modification string for modifying the standardized text document. The platform may provide a second user interface configured to allow a second party to define a second party set of values. The platform may receive the second party set of values, wherein the second party set of values comprises a second party acceptable value for each of the plurality of predefined variables; and an indication of whether the at least one modification string is acceptable. The platform may generate a final set of values for the standardized text document, wherein the final set of values are determined based on the first party set of values and the second party set of values by, for each of the plurality of predefined variables, determining a final value based on a match between the second party acceptable value and the at least one first party acceptable value; selecting the second party acceptable value as the final value if a) the second party acceptable value does not match at least one first party acceptable value and b) the first party approves the second party acceptable value; or selecting a new value proposed by the first party as the final value if a) the second party acceptable value does not match the at least one first party acceptable value, b) the first party does not approve the second party acceptable value, and c) the second party accepts the new value proposed by the first party. Additionally or alternatively, if the indication indicates that the at least one modification string is acceptable, the platform may include the at least one modification string in the final set of values. Additionally or alternatively, if the indication indicates that the at least one modification string is not acceptable, the platform may request and receive approval from the first party to omit or change the at least one modification string. The platform may transmit the final set of values to the first party and the second party.

In some embodiments, the platform may receive the first party set of values prior to beginning collaborative editing involving the first party and the second party. Additionally or alternatively, the platform may store the first party set of values for use in a future collaborative editing involving the first party and a third party. Additionally or alternatively, the final set of values parameterizes the predefined variables of the standardized text document, thereby forming a final text document.

In some embodiments, the first party set of values comprises, for a first key term variable, a default acceptable value and a plurality of alternative acceptable values. In some of these embodiments, the second user interface presents the default acceptable value and an option to accept the default acceptable value as the second party acceptable value. In some of these embodiments, the second user interface further presents an option to view the plurality of alternative acceptable values and to select one of the plurality of alternatively acceptable values as the second party acceptable value. Additionally or alternatively, the second user interface further presents an option to view the plurality of alternative acceptable values and to propose a different value as the second party acceptable value.

In some embodiments, the first party set of values comprises, for at least one of the predefined variables, a first party ranked list of acceptable values. Additionally or alternatively, the first party set of values and the second party set of values are received by the platform prior to the beginning collaborative editing involving the first party and the second party, and the method further comprises, for at least some of the predefined variables, determining a plurality of matches between the first party set of values and the second party set of values; and selecting a highest-ranked match from the plurality of matches as the final value.

In some embodiments, the second party set of values further comprises a second modification string for modifying the standardized text document, and the method further comprises including the second modification string in the final set of values based on receiving approval from the first party to include the second modification string.

In some embodiments, providing the first user interface comprises retrieving, by the platform, first party data corresponding to the standardized text document, wherein the first party data comprises a library of modification strings that may be used for modifying the standardized text document; and configuring the first user interface based on the first party data prior to providing the first user interface. In some of these embodiments, the first party data specifies one or more standard modification strings that are usable by any party and one or more custom modification strings that are usable by the first party.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings:

FIGS. 2A-B illustrate example data structures for use in embodiments of the present disclosure.

FIG. 5 illustrates another example method for collaborative document editing according to some embodiments of the present disclosure.

DETAILED DESCRIPTION

Figure 1A:
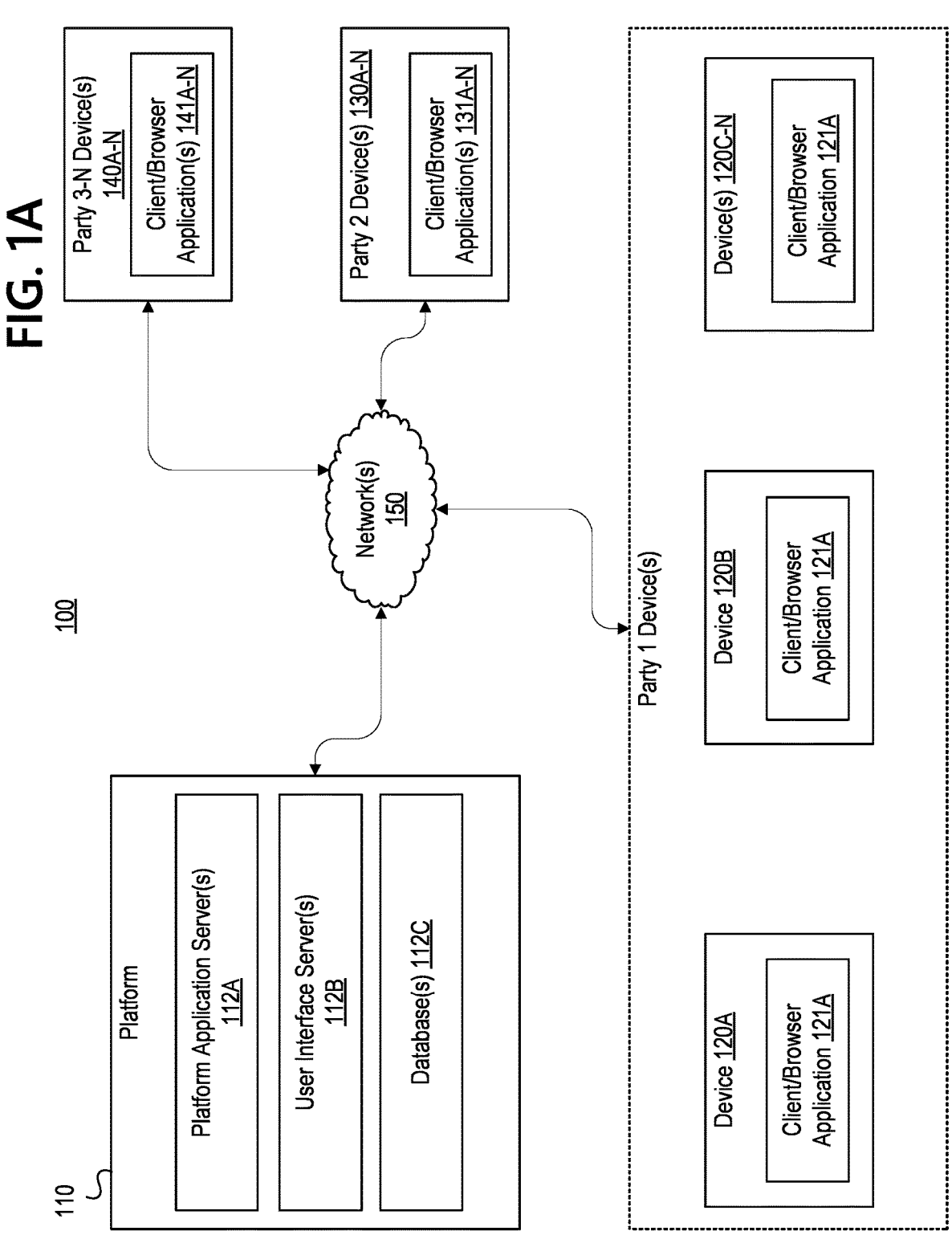
FIGS. 1A-B illustrate an example environment comprising various example systems according to some embodiments of the present disclosure.

Conventional processes for collaborative editing are inefficient in part because they may not sufficiently encourage and/or leverage the use of standard text documents such as agreement templates, plan templates, or any other standardized text documents. Moreover, even when one party begins with a standard text document, another party may quickly depart from the standard text document by removing standard text or making extensive changes to the standard text document. Furthermore, one party's preferred changes to a standard text document may not be easily reusable if the same party later wants to reuse the standard text document for another use, for a collaboration with another party, and/or the like.

Techniques described herein solve these and other problems in part by providing standardized text documents including variables that may be edited using one or more separate party-specific templates to generate a document "card" without needing to change the underlying standardized text document. The document card may include a plurality of values that may be used to parameterize the standardized text document. Thus, the process of collaboration and/or negotiation may be focused on the values of the variables defined in the standardized text document, rather than inefficiently editing the text itself.

Techniques described herein provide additional efficiency benefits by allowing a party to define multiple acceptable values for any of the variables defined in a standardized text document. While prior methods may require a separate channel of communication to transmit this information (e.g., a phone call or email between parties), the techniques described herein allow this information to be decided ahead of time using one or more appropriate stakeholders (e.g., users, admins, reviewers, or any other stakeholder). Furthermore, the multiple acceptable values may be stored as data associated with a specific party and reused multiple times (e.g., when the same standardized text document needs to be edited repeatedly for any reason) for different collaborative editing sessions involving the same set of parties (e.g., for repeatable tasks) and/or different sets of parties (e.g., for a standard agreement that may be edited with multiple different counterparties).

In addition to the use of variables, which enhance efficiency by focusing collaboration/negotiation on the most important parts of the document, techniques described herein may leverage modification strings to add additional text to the underlying standardized text document. However, during editing, the modification strings may be kept within a separate document card instead of being used to modify the underlying standardized text document, which provides several additional benefits. For example, in contrast to the variables that are defined by the document itself, the use of modification strings as described herein further allows for more flexible editing of a standardized text document while still preserving efficiency and reusability.

The techniques described herein may be useful in several different contexts. As one example, standardized text documents may be legal agreements such as NDAs or any other contracts. In these examples, the variables may represent standard terms such as an identity of a party, a confidentiality term, a jurisdiction (e.g., choice of law, courts), and the like. However, the techniques described herein are useful in several other collaborative editing contexts as well. For example, standardized text documents may be templates that are useful in any context, such as for managing projects that may include task/role assignments to multiple parties, event planning, plans/proposals that otherwise involve multiple parties (e.g., trip planning), and/or any other task involving multiple parties that may be collaboratively editing a document. For example, a project management template may define tasks and/or roles, and variables may be used to assign the tasks and/or roles to various parties, set deadlines for tasks, etc.

In the context of legal documents, the techniques described herein provide further benefits in that the standardized text documents may be standardized agreements that may be developed as neutral documents with vetted language that do not favor one party or another. Thus, customers may have an incentive to join the platform for access to the templates, which provides an alternative to both sides attempting to start negotiations using their own custom agreements/templates. Starting a negotiation using either party's custom forms is highly inefficient because the other side must fully review the custom form from scratch instead of starting on a neutral basis with language that may be familiar to both sides. Moreover, a counterparty may have increased suspicion when starting from another side's form, which may reduce the chances of a successful agreement. Although these benefits may be particularly strong in a legal context, they may also apply in any of the other contexts described herein.

These and other benefits of the techniques described herein will be apparent from the detailed description that follows.

Environment

FIG. 1A shows an environment 100 including components that carry out methods and operations as described in more detail below. The environment 100 may include a plurality of devices that comprise a platform 110 and devices associated with various parties, such as Party 1 devices 120A-N, Party 2 Devices 130A-N, and Party 3-N Devices 140A-N, where the plurality of devices are connected via one or more network(s) 150. The network connections shown are illustrative and any means of establishing communications links between the various devices may be used. The existence of any of various network protocols such as TCP/IP, Ethernet, FTP, HTTP and the like, and of various wireless communication technologies such as GSM, CDMA, Wi-Fi, and LTE, is presumed, and the various computing devices described herein may be configured to communicate using any of these network protocols or technologies.

The platform 110 may itself include a plurality of devices, including one or more platform application server(s) 112A, one or more user interface server(s) 112B, and/or one or more database(s) 112C. In general, the platform 110 may provide functionality to the various devices 120, 130, 140 that allows users of the devices to collaboratively edit standardized text documents and perform various other actions as explained in more detail below. For example, platform application server(s) 112A may be configured to perform various backend operations involving creating, retrieving, modifying and storing data to/from the database(s) 112c in service of the various methods and flows described herein. Such data may include data about documents, users, organizations, and/or other such data as described in more detail below. User interface servers 112B may be configured to generate various pages for display on client/browser applications 121, 131, 141 of the various devices 120, 130, 40 as described in more detail below. For example, the user interface servers 112B may be web servers that generate web pages and/or web applications (e.g., using HTML, JavaScript, and/or other web technologies) for display within a browser application on the devices 120, 130, 140. These functions, and additional functions of the platform 110, are described in more detail below.

The various party devices 120, 130, 140 may be user devices used by various users to interact with the platform via a client/browser application 121, 131, 141 on each device. For example, one user may use a device 120A in an admin role to configure an organization's settings, another user may use another device 120B to set up one or more document templates, and a third user may use another device 120C to approve the templates set up by the second user. The devices may include mobile devices (e.g., smartphones, laptops, tablets), wearable devices (e.g., smartwatches, VR/AR/XR headsets), other computing devices (e.g., desktop computers, servers), and/or any other devices that may run and interact with the client/browser application 121, 131, 141. In embodiments, the client/browser application 121, 131, 141 may communicate with the user interface server(s) 112B to provide a client/server user interface that allows respective users of the devices 120 interacting with the platform 110. Additionally or alternatively, the client/browser applications 121, 131, 141 may perform any of the features and functionalities ascribed to the platform 110, such that the system may be completely decentralized, partially decentralized, and/or perform any of the operation described herein locally on the devices 120. In embodiments, the client/browser application 121, 131, 141 may be one of various web browsers, which may be used interchangeably. For example, a first device 120A may use a CHROME web browser 121A, another device 130A may use an EDGE web browser 131A, etc., where each device may use any web browser. Additionally or alternatively, the client/browser application 121, 131, 141 may include various versions that may be native to various operating systems, such as a WINDOWS version, an OSX version, etc.

In embodiments, the platform 110 may be one or more computing devices that may implement one or more respective servers, databases, etc. In embodiments, the platform 110 may be implemented using a cloud services provider, which may manage the distribution of tasks and/or workloads across the various computing devices. The computing device(s) making up the platform 110 may execute the methods and operations described herein using serial, parallel, hierarchical, and/or other computing techniques. For example, a first computing device may distribute sub-tasks of a task to various computing devices of the platform (e.g., when the sub-tasks are parallelizable), may balance workloads between the computing devices, and the like. Thus, although the platform may be described as a single entity, the platform may use a plurality of computing devices working in coordination to complete the tasks described herein.

The database(s) 112C may be implemented via various cloud services, via database servers, and/or the like. The database(s) 112C may include, but are not limited to relational databases, hierarchical databases, distributed databases, in-memory databases, flat file databases, XML databases, NoSQL databases, graph databases, and/or a combination thereof.

Figure 1B:
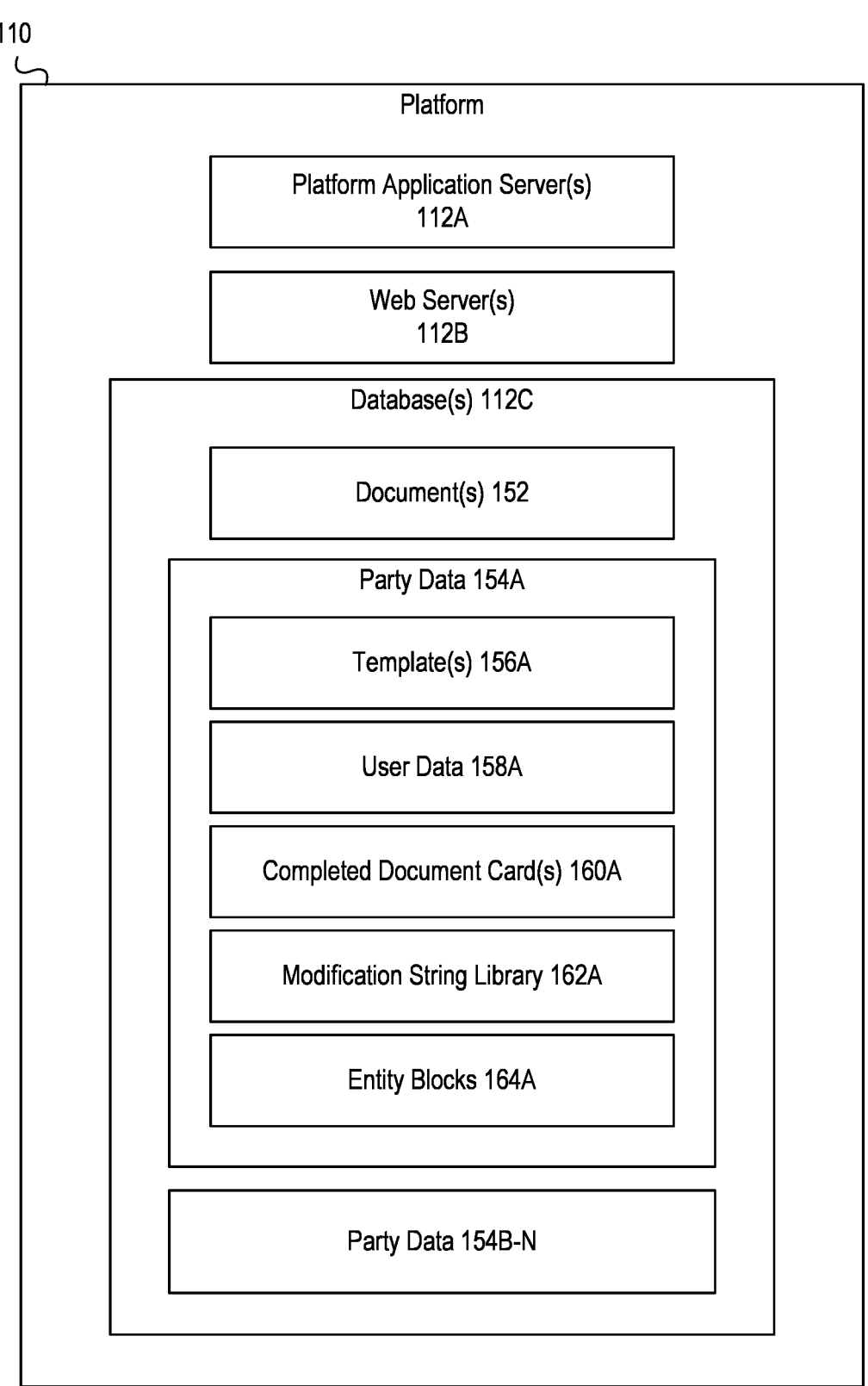

FIG. 1B illustrates additional details of the database(s) 112C within the platform 110. As shown in FIG. 1B, the database(s) 112C include a plurality of documents 152 for use with the various collaborative editing functionality described herein. The databases 112C may further include party data 154 for each of a plurality of parties (which may be organizations). Each set of party data may include one or more templates 156 (e.g., templates 156A for first party data 154A) that define variables and other attributes for collaborative editing, user data 158 that may define a plurality of users associated with a party/organization and associated data (e.g., name, email, title, role, groups, etc.), one or more completed document cards 160 that may be generated using the collaborative editing/negotiation processes described herein, one or more modification strings that may be added to templates 156 in a modification string library 162, and/or one or more entity blocks 164 defining entity variables that may be added to templates 156, as described in more detail below.

Example Data Structures

FIG. 2A illustrates details for an example template 156, which may be used by a party to configure a corresponding standardized text document 152. A template 156 may be specific to a party because the template includes values for one or more key variables 204 that are chosen by the party, one or more values for entity variables that are specific to the party, and/or various values for one or more role variables that are specific to the party.

The template 156 may relate to a specific document 152, which may be indicated using a document identifier 202 that indicates the specific document 152. The template 156 may relate to a specific document 152 because one or more key variables 204 may be defined by and correspond to a specific document. In other words, a specific document 152 may include a plurality of key variables that may be assigned values collaboratively using templates 156. Additionally or alternatively, one or more modification strings 212 may be used to effectively modify the text of the document 152, as described in more detail below.

In embodiments, each key variable may be defined by a related document 152. For example, if an example related document 152A is a non-disclosure agreement (NDA), a first key variable 204A for an example template 156A may be a "purpose" variable indicating a purpose of the NDA, a second key variable 204B may be an "effective date" variable indicating when the NDA becomes effective, a third key variable 204C may be "term" variable indicating when the NDA expires, a fourth key variable 204D may be a "confidentiality period" variable indicating when the confidential period ends, etc. As will be appreciated, these variables are only exemplary, and different key variables 204 may be used for different documents 152, which may include agreements such as NDAs and/or any other type of document.

In embodiments, for each of the key variables 204, a template may define one or more preferences 206 and/or one or more acceptable alternatives 208. A preference 206 may include a variable value that may be automatically acceptable to the party associated with the template when collaboratively editing or negotiating the corresponding document. For example, a preference 206 may be a default value chosen by the party for a particular key variable. The acceptable alternatives 208 include one or more alternative acceptable values that have been predesignated as acceptable by the party. The acceptable alternatives 208 may not be presented by default and/or may optionally be omitted.

Instead of or in addition to defining one or more preferences and/or acceptable alternatives, the template 156 may define a ranked list 210 of acceptable values in order of priority. For example, a ranked list may include the most preferred value in a first ranking position, a second most preferred value in a second ranking position, and so on.

The template 156 may further include one or more modification strings 212 that may be used to modify to the related document 152 indicated by the document identifier 202. For example, as described in more detail below, modification strings 212 may be selected from a modification strings library 162 and may effectively add new material to the underlying document, such as new requirements, new provisions, new clauses, and/or any other new material.

The template 156 may further include an entity block 164 including one or more variables associated with the party that created the template 156. The entity block 164 may include one or more entity(ies) 214, which may include a name of the party (e.g., individual/organization) and/or sub-organizations, partners, owners, etc. The entity block 164 may further include one or more notice addresses 216 that may define mailing addresses and/or email addresses for the entity(ies) 214. One or more location variables 218 may define various locations associated with the entity and/or the document. For example, in a legal document context, the local variable(s) may include a governing law variable (e.g., a variable specifying which laws govern interpretation of the document) and/or a courts variable (e.g., a variable specifying which courts have jurisdiction over the agreement formed by the document). In embodiments, the location variables(s) 218 may be structured in a similar manner as the key variables 204, with one or more preferences 206, acceptable alternatives 208, and/or a ranked list 210 of multiple values for each of the location variables 218. The entity block 164 may further include one or more signer(s) 220 responsible for executing any completed document card(s) 160 generated based on the template 156.

The template 156 may further include one or more role variables 222 defining how various users may interact with the template 156. For example, a users variable 224 may define one or more users (e.g., of an organization) who may use the template to generate completed document card(s) by collaboratively editing and/or negotiating with other parties/organizations. For example, a user may have permission to contact another party to begin working on a completed document card 160 with the other party. An approvers variable 226 may define one or more users of the organization who may approve various changes and/or deviations from the template 156 during collaborative editing and/or negotiation, as described in more detail below. A template editors variable 228 may define one or more users with permissions to edit and/or delete the template 156.

Figure 2B:
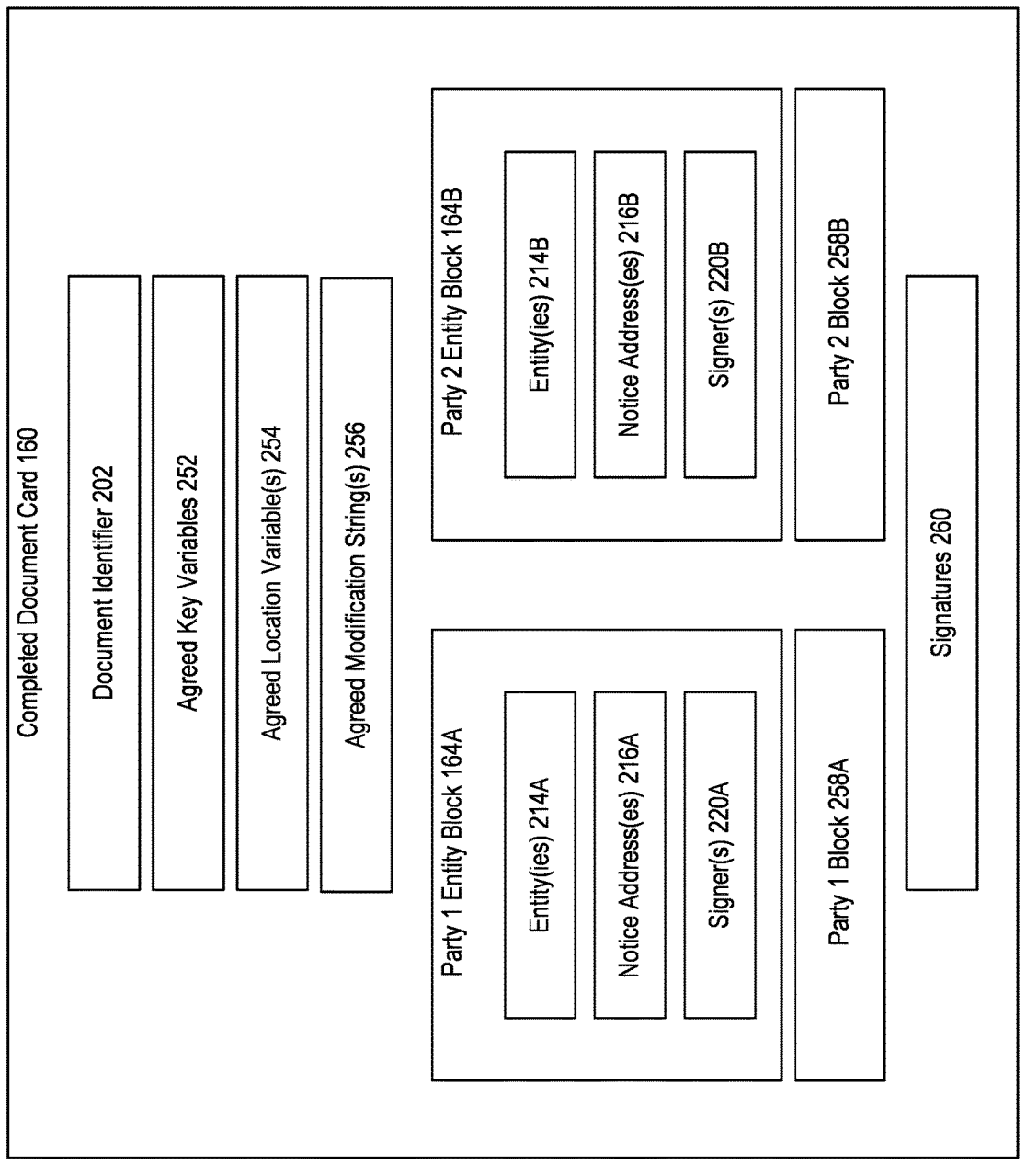

FIG. 2B illustrates an example of a completed document card 160, which the platform 110 may generate based on collaborative editing/negotiation between two parties. A completed document card 160 may define a plurality of agreed variables and/or modification strings and entity information for completing a document 152. For example, if the document 152 is an unsigned agreement (e.g., a legal contract), the completed document card 160 may effectively parameterize the document and create an executed agreement based on the values of various variables and/or modification strings and the corresponding language within the document 152. As shown in FIG. 2B, some of the variables are agreed variables (e.g., where both entities agreed to the values) and some variables are entity specific. In embodiments, each of the illustrated variables of the completed document card 160 may include a plurality of values, each of which has a particular assigned data type (e.g., string, date, integer, list of objects, etc.).

As shown in FIG. 2B, a completed document card 160 may be specific to a document 152, which may be identified by a document identifier 202. The document card 160 may include a plurality of agreed key variables 252, agreed location variables 254, and/or agreed modification strings 256, which may be generated using the collaborative editing/negotiation methods described in more detail below. The agreed variables and/or agreed modification strings may have been selected based on a first template 156A associated with a first party and the document identified by the document identifier 202, based on a second template 156B associated with a second party and the same document and/or based on various further communications between the parties. Each of the agreed variables may parameterize a variable within the corresponding document 152, whereas each agreed modification string may modify the text of the document 152.

The completed document card 160 may further include one party's entity block 164A, which may include entity(ies) 214A, notice address(es) 216A, and/or signer(s) 220A for the first party as discussed above. The completed document card 160 also includes another party's entity block 164B, which may similarly include entity(ies) 214B, notice addresses 216B, and/or signers 220B as discussed above.

The completed document card 160 may further include blocks 258 for each party. A first party block 258A may include information about the first party, such as the name, title, and/or contact information (e.g., email address) for a user responsible for initiating and managing the collaborative editing/negotiation (e.g., a sender). A second party block 258A may similarly include information about the second party, such as the name, title, and/or contact information (e.g., email address) for a user responsible for responding and managing the collaborative editing/negotiation (e.g., a receiver). The completed document cards 160 may further include signatures 260 of the signers 220 for each party.

In embodiments, a completed document card 160 may be stored in a data structure (e.g., in JSON or an equivalent). In some cases, the document card 160 may include a history of changes reflecting, for example, negotiations (e.g., proposals, counterproposals, etc.) over variables and/or modification strings prior to generating the agreed variables and/or modification strings, and/or other changes/edits made during the example methods described below. In these embodiments, the history of changes may include timestamps of changes for each variable, which party proposed the change, and/or the like.

Example Methods

Figure 3A:
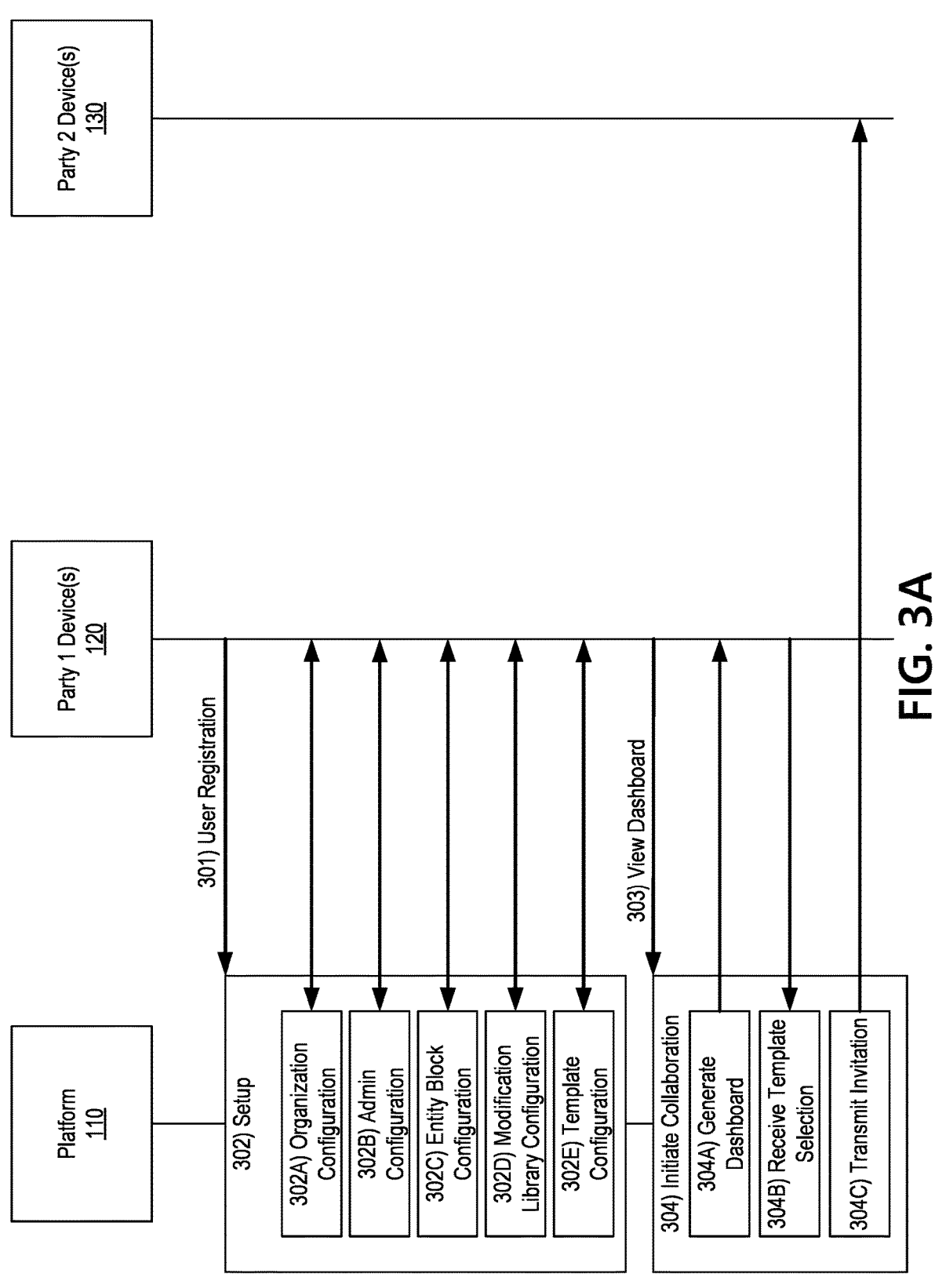
FIGS. 3A-C illustrate an example method for collaborative document editing according to some embodiments of the present disclosure.
Figure 3B:
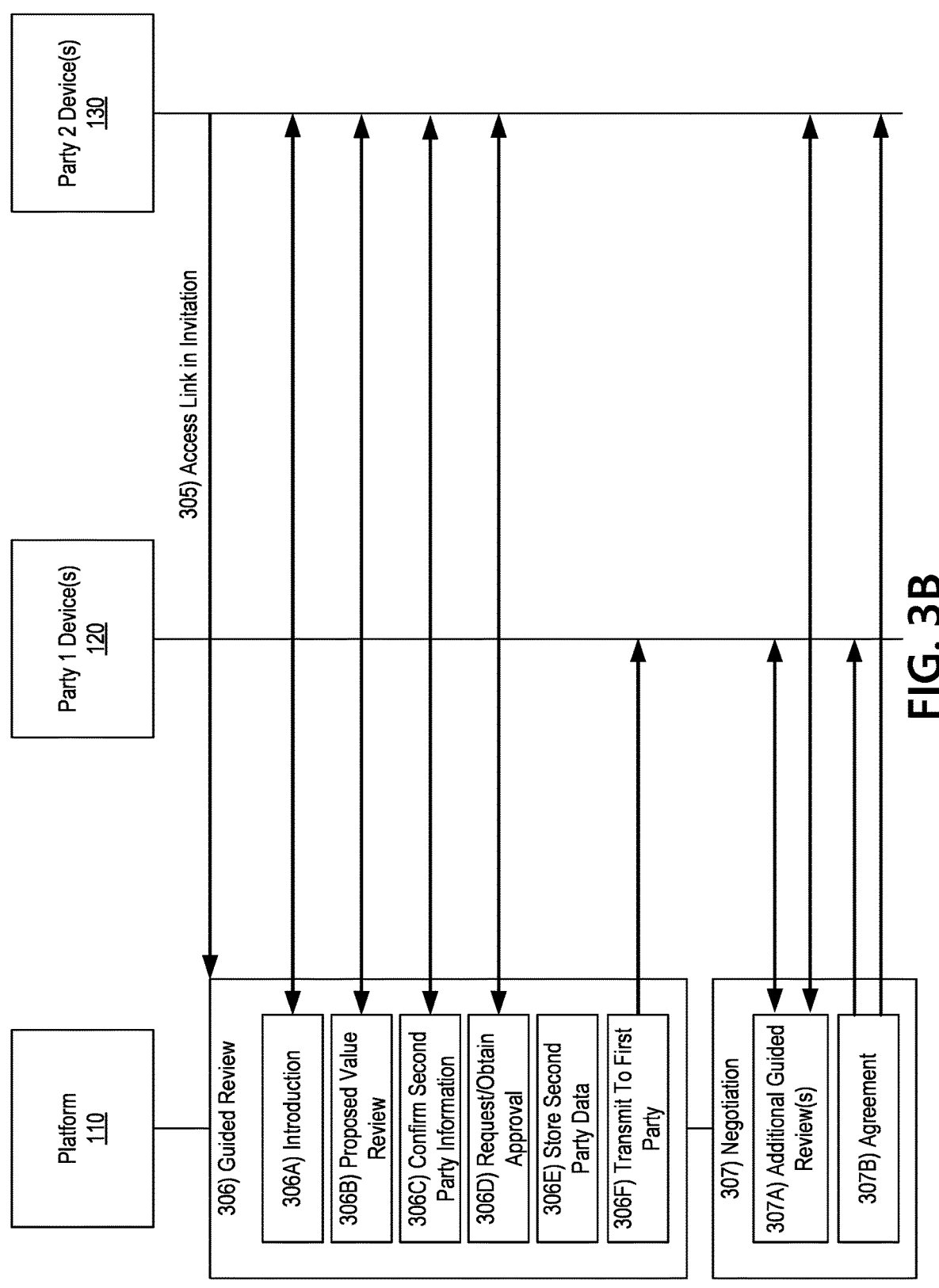
Figure 3C:
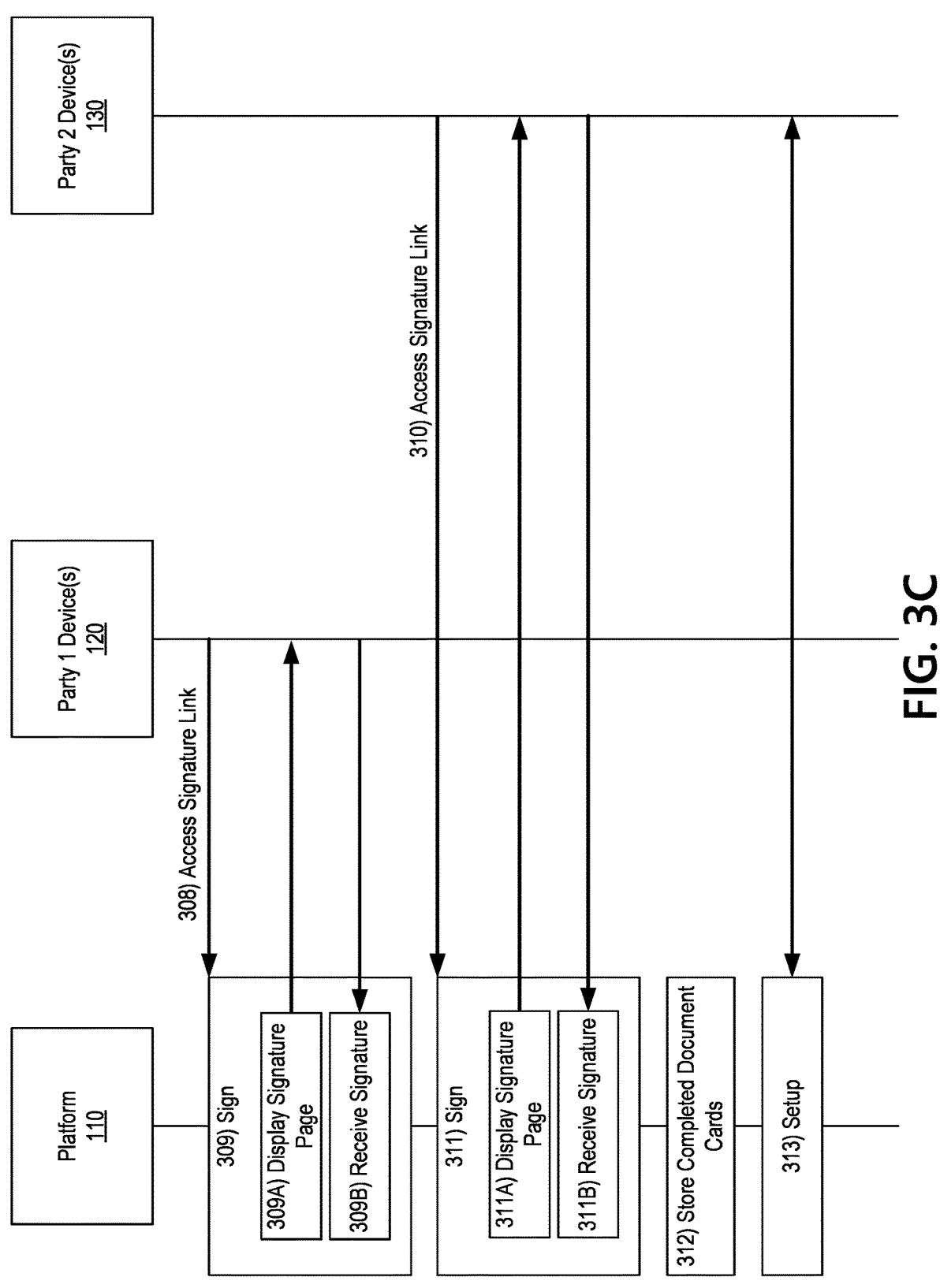

FIGS. 3A-C illustrate an example flow diagram that may be implemented by the platform, one or more devices associated with a first party, and one or more devices that may be associated with a second party. In the example flow, the first party and the second party may collaboratively generate a completed document card 160 comprising a set of variables that parameterize a standardized text document.

At 301, a first party device 120 may initiate registration with the platform 110 to create a new user account. For example, the first party device 120 may access a website provided by the platform 110 and select a link for registering a new account. In embodiments, the platform 110 may provide a registration page that may allow a user to initiate registration using a single sign-on (e.g., using Google SSO and/or the like), by entering user information such as a name, email address, and/or password, and/or using other authentication methods. In embodiments, the user may be required to accept a terms of service, privacy policy, and/or the like to initiate registration.

At 302, the platform 110 may guide one or more users through a setup phase, which may involve one or more communications and/or interactions with one or more first party devices 120. For example, at 302A, the platform may allow a user to register the user account with an organization, which may include setting up a new organization based on determining that a database 112C does not include any party data 154 defining an organization associated with the domain name of an email address entered at 301. In these cases, the new user may create a new set of party data 154 for the organization during admin configuration 302B, discussed in more detail below.

Additionally or alternatively, if the platform 110 determines at 302A that a party/organization associated with the user's domain name already exists, a new user account associated with a device 120 may be automatically joined to the organization and/or may be joined to the organization after the platform 110 generates and transmits a webpage and/or user interface data (herein, a "page") to device 120 requesting that the user confirm that the new user account should be joined to the organization, and an affirmative response is received from the device 120. The platform 110 may then set up the new user account as user data 158 within the existing party data 154. In some embodiments, an admin for the organization may need to approve the new user before the new user is allowed to join the organization. In some cases, an admin may have already defined user data (e.g., role, name, title) for the new user account (as discussed in more detail below), which may be retrieved by the platform 110 and used to set up the new user account and/or transmitted to the device 120. Additionally or alternatively, a new user may be assigned a default role upon joining an existing organization.

Additionally or alternatively (e.g., if the user signs in via SSO and/or using a common email domain such as "gmail-.com"), the platform 110 at 202A may generate and transmit (to device 120) a page requesting the user to specify whether the user wishes to create a new organization and/or join an existing organization. Based on a response received from the device 120, the new user account may be associated with a new organization and/or joined to an existing organization as described above.

In some cases, the platform 110 at 302B may proceed with admin configuration. For example, if a new user account created a new organization at 202A, the new user account may be designated as an admin and the platform 110 may perform admin configuration with the new account. In some cases (e.g., when the new user joins an existing organization and receives a pre-assigned role and/or a default role), the admin configuration at 202B may be skipped.

At 302B, the admin user may request and the platform 110 may generate and transmit to device 120 (e.g., a device used by the admin user) one or more pages that allow the admin user to configure various organization settings such as SSO settings, integration settings (e.g., for external tool integrations), registration data, and/or the like. For example, an admin at device 120 may define and/or select a plurality of user roles (described elsewhere herein) and associate one or more user roles with various user accounts (which may be created and/or preconfigured by the admin). Additionally or alternatively, the admin at device 120 may create, modify, and/or deactivate user account, create, modify, and/or delete user groups, set up billing data, and/or the like via the page(s) received from the platform 110.

In embodiments, at 302B the admin user may request and the platform 110 may generate and transmit to device 120 a "view users" page that allows the admin to view a list of all users associated with an organization, select one or more filters, view a filtered list, search for a specific user by name or email, view/expand user details, and/or the like. In these embodiments, the platform 110 may retrieve and/or filter user data 158 from the database(s) 112C, format the user data for display within the page(s), and transmit the user data to the device 120 for display. The platform 110 may receive selections from the device 120 and/or respond accordingly.

In embodiments, at 302B the admin user may request and the platform 110 may generate and transmit to device 120 a "create users" page that allows the admin to create a user account associated with the admin's organization, set up user information (e.g., email, name, title), set permissions/ roles for the user account, set user group memberships, and/or the like. In these embodiments, the platform 110 may receive data from the device 120 and generate user data 158 for storage within the database(s) 112C. In embodiments, the platform 110 may provide a page that allows an admin user to upload a data structure (e.g., a CSV file) specifying a plurality of users and associated information. In response to receiving the uploaded data structure, the platform 110 may generate a plurality of user accounts and store them as user data 158. Additionally or alternatively, the platform 110 may provide a page that allows an admin to connect the platform 110 with an external system that defines user accounts and associated information (e.g., Active Directory). After the platform 110 receives connection information (e.g., authentication information), it may connect to the external system, retrieve user account and associated information, and convert the retrieved data into user data 158.

In embodiments, at 302B the admin user may request and the platform 110 may generate and transmit to device 120 a "modify users" page that allows the admin to view a list of all users associated with an organization and modify any information associated with a selected user (e.g., email, name, title, role, user groups, etc.). In these embodiments, the platform 110 may retrieve and/or filter user data 158 from the database(s) 112C, format the user data for display within the page(s), and transmit the user data to the device 120 for display. The platform 110 may receive modifications from the device 120 and update the user data 158 accordingly. Additionally or alternatively, the platform 110 may provide a function for deactivating or deleting a user account, which the device 120 may select to update the user data 158 accordingly.

In embodiments, at 302B the admin user may request and the platform 110 may generate and transmit to device 120 a "view user groups" page that allows the admin to view a list of all user groups and associated users for an organization, select one or more filters for viewing the user groups, view a filtered list of user groups, view/expand user group details, and/or the like. In these embodiments, the platform 110 may retrieve and/or filter user data 158 from the database(s) 112C (which may include user group data), format the user group data and/or associated user data for display within the page(s), and transmit the data to the device 120 for display. The platform 110 may receive selections from the device 120 and respond accordingly.

In embodiments, at 302B the admin user may request and the platform 110 may generate and transmit to device 120 various pages that allow the admin user to create, modify, and/or delete user groups. For example, an admin user may add and/or remove users from groups. Based on the various responses received from device 120, the platform 110 may update the user data 158 (which may include user group data).

In some cases, at 302C the user may request and the platform 110 may proceed with entity block configuration. For example, entity block configuration may be assigned to users with a supervisor role. In these examples, if the new user account is assigned to a supervisor role (e.g., based on an admin previously designating the user as a supervisor during admin confirmation 302B), the platform 110 may allow the supervisor user to perform modification library configuration.

In embodiments, at 302C the supervisor user may request and the platform 110 may generate and transmit to device 120 (e.g., a device used by the supervisor user) various pages that allow the supervisor user to create, edit, and/or delete one or more entity blocks 164. In embodiments, a supervisor user may be the same user or a different user as the admin user.

In embodiments, the entity blocks 164 may be reused across multiple templates. In these embodiments, each template 156 that is associated with a particular entity block 164 may store an indicator of the particular entity block 164 (and/or a database 112C may include data linking the template 156 and corresponding entity block 164). Accordingly, the platform 110 may generate and transmit to device 120 a page that allows a supervisor user to edit any or all of the entity blocks 164. In these embodiments, the page transmitted by the platform 110 to the device 120 may allow the supervisor user to view a list of different entity blocks 164, create a new entity block 164, remove an entity block 164, change a name of an entity block 164, etc. When the supervisor user makes any changes, the device 120 may transmit the changes to the platform 110, which may update the entity block 164 and/or any templates 156 that are linked to the entity block (e.g., based on template configurations, discussed in more detail below). In embodiments, the supervisor user may control which linked templates 156 are updated to reflect the changes to the modified entity block 164 (e.g., by individually selecting or deselecting the various templates 156 that are linked to the entity block 164, where the page may include selection mechanisms such as checkboxes for each linked template 156).

In these embodiments, at 302C the user may request and the platform 110 may generate and transmit to device 120 various pages that allow a supervisor user to add, change, or remove one or more entity(ies) 214, notice addresses 216, location variables 218, and/or signers 220. For example, the pages may be configured to allow a supervisor user to view a list of entities/addresses/location variables/signers, create a new entity/address/location variable/signer, remove an entity/address/location variable/signer, and/or change the name of an existing entity/address/location variable/signer. When the supervisor users makes any changes, the device 120 may transmit the changes to the platform 110, which may update the set of entity(ies) 214, notice addresses 216, location variables 218, and/or signers 220 and/or any entity blocks 164 that contain a changed variable and/or templates 156 that are linked to the entity blocks 164. In embodiments, the supervisor user may control which linked templates 156 are updated with the modified entity blocks 164 (e.g., by individually selecting or deselecting the various templates 156 that are linked to the entity block 164, where the page may include selection mechanisms such as checkboxes for each linked template 156).

In some cases, a user may initiate modification library configuration, which the platform 110 may perform at 302D. For example, modification library configuration may be available to and/or assigned to users with a supervisor role. In these examples, if the new user account is assigned a supervisor role (e.g., based on an admin previously designating the user as a supervisor during admin confirmation 302B), the platform 110 may allow the supervisor user to perform modification library configuration.

In embodiments, at 302D the user may request and/or the platform 110 may generate and transmit to a device 120 (e.g., a device used by the supervisor user) various pages that allow a supervisor user to create, edit, and/or delete one or more modification strings within a modification string library 162A. A modification string library 162A may include, for each modification string, a title of the string, a usage note (e.g., detailing when the modification string should be used), and the text of the string, any or all of which may be set by the supervisor user. For example, a supervisor can interact with the page to view a list of modification strings, create new modification strings, remove modification strings, and/or change the title and/or usage note for an existing modification string. In some cases, the supervisor may edit a modification string that is already linked to a template 156 (e.g., as a modification string 212 of the template 156). In these cases, the pages transmitted to the device 120 may indicate the templates 156 to which the modification string is linked. Moreover, after updating the modification string, the supervisor user may control which linked templates 156 are updated with the updated modification string (e.g., by individually selecting or deselecting the various templates 156 that are linked to the modification string, where the page may include selection mechanisms such as checkboxes for each linked template 156).

In some cases, at 302E a user may request and the platform 110 may proceed with template configuration. For example, template configuration may be assigned to users with a supervisor role and/or to any users specified by role variables 222 of a template 156 (e.g., a designated user, approver, and/or template editor). In these examples, if the new user account is assigned a supervisor role (e.g., based on an admin previously designating the user as a supervisor during admin confirmation 302B), the platform 110 may allow the supervisor user to perform any aspect of template configuration. For example, a supervisor can generate a new template 156 and set up a document identifier 202 (e.g., specifying which document the template relates to), assign values for one or more key variables 204, including preferences 206, acceptable alternatives 208, and/or a ranked list 210, one or more modification strings 212, one or more entity blocks 164 (including any of the variables 214-220), and/or one or more role variables 222 (including any of the variables 224-228).

In embodiments, if a user is designated as a user 224 or approver 226 of a template 156 (e.g., the user may have been added to users 224 or approvers 226 by a supervisor that initially created the template 156), the platform 110 may allow the user to view a list of templates, view the details for each template (e.g., the the key variables 204, modification strings 212, entity block 164, etc.), and the like. If a user is designated as a template editor 228 of a template 156, the user may perform the same actions as the supervisor user for editing the template.

In embodiments, at 302E a user may request and the platform 110 may generate and transmit to a device 120 (e.g., a device used by the supervisor user and/or template editor) various pages that allow the user to create, edit, and/or delete one or more templates 156. For example, a supervisor can interact with the page to view a list of templates, create new templates, remove templates, and/or change the name of an existing template. In these embodiments, the user may create a template by selecting a document 152 to which the template 156 relates, setting up one or more key variables 204 that are associated with the document 152, adding one or more modification strings 212 from a modification strings library, adding an entity block 164, and/or setting up role variables 222.

To create a template (e.g., upon user request), the platform 110 may generate and transmit to a device 120 a page that includes a list of documents 152 and/or default templates that are configured based on the documents 152 (e.g., the default templates may be preloaded with key variable fields corresponding to the documents 152. A user may interact with the page to select one of the documents and/or default templates to begin the process of creating a new template, which may generate a blank new template with corresponding key variables (and/or default values for the key variables pre-filled), a blank list of modification strings, a blank and/or default entity block 164, and/or blank and/or default role variables 222. Additionally or alternatively, the user may create a new template that is a copy of another template (e.g., if the user wishes to make two different templates for the same document). The user may then edit each key variable to assign values for one or more preferences 206, acceptable alternatives 208, and/or a ranked list 210. In embodiments, the user may define values in terms of ranges (e.g., when defining an acceptable alternative for a numerical key variable, the user may define a range of numerical values that are acceptable alternatives). The user may further edit the modification strings 212 by selecting one or more modification strings from the modification strings library 162 and/or creating a new modification string 212. When the user creates a new modification string 212, the user may save the new modification string 212 to the modification strings library 162. The user may further select an entity block 164 from a list entity blocks to assign the values of variables 214-220 using the selected entity block 164. The user may assign values to one or more role variables 222 by adding users and/or groups of users to the various types of roles (e.g., from lists of users or user groups associated with an organization and/or by entering user contact information, such as a name and/or email address). Users may be assigned to one or more roles.

During template configuration, the user may partially complete a template, which may be finished later by the same user or another user (e.g., by a supervisor adding another user as a template editor 228 so the other user may complete the template). In embodiments, a user may assign a unique name to a template for easier viewing and selection (e.g., when the same user or another user views a list of templates).

In embodiments, during template creation, the platform 110 may track whether a value (e.g., of a key variable) is a default value taken from a default template or a custom value and display a corresponding indicator for each variable. In embodiments, the platform 110 may track whether any role variables 222 include roles assigned to external users (e.g., users outside an organization) and display a corresponding indicator. In embodiments, the platform 110 may display a link for accessing the document 152 associated with the template 156 during template creation. In embodiments, the platform 110 may track and display a history of changes to the template 156 and/or allow reversion to a previous version or value for a particular variable.

In embodiments, a template 156 may be associated with various communications settings, such as a default email to use when sending the template 156 to another party, attachments to include in the email, etc.

After setup 302 is completed, a user may transmit a request from device 230 to view a dashboard 303. It should be noted that the user that the user that views the dashboard may not do so immediately after setup 302 and/or that multiple users may complete setup 302 prior to step 303. For example, a first admin user may perform organization configuration 302A and/or admin configuration 302B, a second supervisor user may perform entity block configuration 302C, modification library 302D, and/or template configuration 302E for one or more templates, additional users may create and/or modify additional templates, and/or the like prior to step 303.

In response to a user request to view a dashboard 303, the platform 110 may begin a process to initiate a collaboration by transmitting an invitation using one of the configured templates. For example, at 304A the platform may generate and transmit to device 120 a dashboard page that indicates any prior invitations that have been sent to other parties and/or collaborations and a status associated with each invitation/collaboration (e.g., invitation unopened, negotiating, tentative agreement, final approval, ready for signature, partially signed, signed, voided, and/or other such statuses, which are described in additional detail below). The dashboard may indicate, for each invitation/collaboration, an identity of the second party, a name of the template that was sent to the second party, a status, a completion percentage, a next step, a user assigned to perform the next step, an "owner" user that initiated the collaboration, a creation date for the collaboration, a last activity date for the collaboration, and age indicating the amount of elapsed time since the creation date. The dashboard may further include a function that allows a user to select a template and send a new invitation to collaborate based on the template.

In embodiments, a user may interact with the page to select a template and send a new invitation. In these embodiments, the platform 110 may only allow users assigned to a user and/or approval role (e.g., as indicated by role variables 222 of a template 156) and/or supervisor users to select a given template 156 and initiate a collaboration. The platform 110 may receive the user's selection at 304B. In some cases, the platform 110 may then generate and transmit to device 120 a confirmation page indicating the details of the selected template 156, an option to change a template selection, an option to temporarily modify one or more values of the template prior to sending (e.g., only if the user has an approver role and/or is a supervisor), and/or otherwise configure an invitation (e.g., by allowing a receiver to view acceptable alternatives or not). Furthermore, the user may input information for the second party 2, including the second party's name (e.g., individual and/or organization name), contact information (e.g., name and/or email), and/or whether any previous invitations have been sent to the second party. Once the information has been input, the user may transmit to platform 110 a confirmation that an invitation should be sent to the second party.

At 304C, the platform 110 may generate and transmit an invitation to the second party based on the contact information for the second party. At the same time, the platform 110 may add an entry for the new collaboration to the first party's dashboard with a current status (which may be updated as the method proceeds). Using the dashboard, a first party user may view the details of the sent invitation, send the invitation to a different recipient (e.g., a second user at the second party), add comments, void/cancel/revoke the invitation, generate a magic link that may be transmitted to the second party for accessing the invitation, etc.

At 304C, the platform 110 may transmit the invitation as an email and/or using any other communication mechanism. For example, when the platform 110 transmits an email, it may generate an email including default text inviting the user to collaborate via the platform 110, a link to access the collaboration via the platform 110, one or more attachments including information about the document 152 and/or template 156, etc.

At 305, a second party device 130 (e.g., a device 130 that received the invitation and/or another device 130, for example if a recipient of the invitation forwarded it to another user) may access a link in the invitation to access the platform 110 and initiate a guided review 306 process for reviewing and collaboratively editing/negotiating the values defined within the first party template. The guided review 306 process may be hosted by the platform 110.

At 306A, the platform 110 may generate and transmit to device 130 (e.g., the device that accessed the link in the invitation) an optional introduction page providing an introduction to the platform 110 (e.g., if the user has not previously accessed the platform 110) and allowing the user to provide several configuration options for the guided review 306 process. For example, the introduction page may ask the second party user whether the second party user wishes to designate an approver, such as another user of a second party organization, legal counsel for the second party, etc. The second user may optionally designate a second party approver (e.g., using a name and/or contact information), which the platform 110 may store as user data 158 within party data 154 for the second party. Additionally or alternatively, the second party user may be invited to send a message to the first party via the platform, which the second party may optionally do. If the second party requests a message to be sent to the first party, the platform 110 may establish a communications channel between the parties (e.g., a chat room), display the message to the first party within the first party's dashboard, allow the first party to send a message back to the second party, and/or the like. Additionally or alternatively, the page may allow the second party user to proceed to a proposed value review 306B.

At 306B, the platform 110 may generate and transmit to device 130 a proposed value review page that allows the second party user to review proposed values based on the values within the first party template. The proposed value review page may present the first party's preferences 306 for each key variable 204, location variable 254, and/or other negotiated variable (and/or a first value of a ranked list 210 for each negotiated variable) and include functions for indicating whether the second party agrees to the presented value or not. The proposed value review page may further display the document 152 so the second party may review the context for the various negotiated variables. In embodiments, the page may be configured to allow the second party to select any of the negotiated variables to quickly search for and view the negotiated variable as it appears within the document 152. The proposed value review page may further allow the second party user to assign or change one or more approvers for the collaboration. The proposed value review page may display a progress bar indicating the second party user's progress though the proposed value review. The proposed value review page may allow the second party user to save a comment that may be reviewed by any other second party user that accesses the collaboration (e.g., an approver). The proposed value review page may allow the second party user to save progress for later resumption, view a history of changes/comments/activity, view help, and/or perform other such actions.

For each negotiated variable, the second party may agree and/or propose an alternative value. In some cases, if the second party selects a function to propose an alternative value, the second party may be presented with one or more of the acceptable alternatives 208 and/or additional lower-ranked items from the ranked list 210. The proposed value review page may indicate that the first party is willing to accept one of these alternative options. The proposed value review page may be configured to allow the second party to accept one of the alternative options and/or propose a new option. As a specific example, a second party may initially review a "Term of NDA" key variable, which may include a preference 206 value indicating 12 months (e.g., the first party's preferred term length). The second party may then select a "propose alternative" function, which may cause the page to display the first party's acceptable alternatives 208 (e.g., 18 month, 24 months, a range including any value within 12-24 months, etc.). The second party may then select an acceptable alternative value and/or propose a new value (e.g., 36 months). The second party may proceed in this manner, either accepting the preferred value, accepting one of the acceptable alternatives, and/or proposing a new value, for each of the negotiated variables (e.g., key variables, location variables, etc.) associated with the template 156 that was sent via the invitation. In embodiments, if the second party user selects an alternative value and/or proposes a new value, the proposed value review page may prompt the second party user for an optional comment explaining their selection. A second party user may propose a new value using various interface options presented by the proposed value review page, such as a text entry, a selection from a menu, and/or the like. In some cases, when a second party proposes a new value, the second party may provide several options, such as a preference 206, one or more acceptable alternative(s) 208, and/or a ranked list 210.

The proposed value review page may further indicate the first party's selection of one or more modification strings 212 (e.g., if the first party included any modification strings 212 in the template 156). For each of the modification strings 212, a user of the device 130 may indicate whether the second party accepts the modification string 212, whether the second party user proposes any changes to the modification string 212, and/or whether the second party user rejects the modification string 212. Additionally or alternatively, the proposed value review page may allow the second part user to propose additional modification strings 212 that the first party template 156 did not include. In these embodiments, the proposed value review page may provide access to a menu or search function that allows the second party user to view and/or select modification strings from a modification string library stored as second party data 154 and/or a default modification string library. Accordingly, the second party user may use device 130 to designate a second set of modification strings 212, some or all of which may overlap with the first set of modification strings 212 from the first party template 156 and/or some or all of which may differ from the first set of modification strings 212.

The proposed value review page generated by the platform 110 may include other functions, such as allowing the device 130 to assign and/or change an approver for the collaboration/negotiation. For example, a user of the device 130 may select one or more users (e.g., another second party user and/or any external user such as legal counsel approved by an admin user, wherein the user may be designated by an email address or other contact information) that need to review and/or approve the accepted values and/or proposed new values (e.g., the values for each negotiated variable and/or the second party set of modification strings) prior to transmitting the approved values and/or proposed new values back to the first party. The proposed value review page may allow the second party user to create a comment for later review (e.g., for later review by an approver or another user). The proposed value review page may allow the second party user to view a progress indicator, download data for transmission to another user, save and resume later, view a history of comments or activity, view various resources such as a help or about pages, and/or the like.

At step 306C, after the second party user completes the proposed value review page by accepting one or more first party values and/or proposing new values (e.g., for each negotiated variable and/or modification string), the platform 110 may generate and transmit to device 130 a second party information confirmation page. The second party information confirmation page may present second party information for approval and/or modification by the second party user. For example, in some cases the first party may have filled in some second party information as part of step 304C (e.g., one or more names and/or contact information for the second party). The second party user may use device 130 to confirm and/or modify this information. Additionally or alternatively, the second party user may use device 130 to enter or confirm company information such a company name, notice address(es), mailing address(es), and/or other second party data.

At step 306D, the platform 110 may allow the second party user (e.g., the user that selected the second party values via the proposed value review page) to request approval of any second party approving user(s). In some embodiments, the platform 110 may generate and transmit to device 130 a review page that allows a user to review a summary of the second party values (e.g., the accepted first party values and/or proposed new values for the negotiated variables and/or modification strings) as well as the first party proposed values (e.g., where the values the differ). The review page may include a "request approval" function that causes the platform 110 to transmit an approval request to the designated approver(s). In embodiments, the review page may allow the user to revise/edit any of their previous selections, such as accepted values and/or proposed new values, prior to requesting approval.

The platform 110 may then transmit a notification to the one or more approver(s) (e.g., a notification email) that approval is needed. The notification may contain a selectable link for accessing an approval page of the platform 110. Upon selection of the link by a device 130 controlled by an approver, the platform 110 may generate and transmit to device 130 an approval page that allows an approver to perform various approval functions. In embodiments, the approval page may allow the approver to designate additional or alternative approvers. The approval page may allow the approver to approve or reject the entirety of the negotiation/collaboration (e.g., such that the approver may not need to accept or reject each individual value). The approval page may allow the approver to approve or reject individual values (e.g., each value for each negotiated variable and/or modification string), may view and/or modify any other actions taken (e.g., values rejected/accepted, comments added, second party information, etc.), create additional comments, request additional information from another user (e.g., the user that performed the proposed value review at step 306B), and/or indicate a final approval.

At step 306E, the platform 110 may store the approved data as second party data 154. The approved data my include one or more of second party values for each key term variable, location variables, and/or other negotiated variable, one or more modification strings, second party information (e.g., approvers, contact information, etc.), and/or any other information entered by any second party users.

At step 306F, the platform 110 may transmit the second party values to the first party. For example, the platform 110 may send a notification to a first party user (e.g., an email notification), update a first party dashboard, and/or the like. The platform 110 may generate a link to a review page for reviewing the second party values and embed the link in the notification and/or first party dashboard. The platform 110 may transmit the second party values automatically upon final approval and/or after a second party user selects a "transmit to first party" function.

In some cases, each of the second party values may be an acceptable value for the first party. In these cases, the process may continue at an agreement step 307B as described below. However, in some cases, at least one of the second party values differ in some way from the first party acceptable values. For example, the second party may have proposed a new value for a key term variable, location variable, or other variable, may have rejected a modification string, proposed changes to a modification string, and/or proposed inclusion of an additional modification string. In these cases, the platform 110 may guide the first and/or second parties through additional collaboration/negotiation 307 until agreement is reached, as described below.

Although not shown in FIG. 3B, in some embodiments the platform 110 may host a collaborative session involving both parties if agreement has not been reached. For example, the platform 110 may set up a live chat, a conference (e.g., via ZOOM or some other video conferencing solution), or some other collaborative forum for both sides to meet and discuss any remaining issues. In these embodiments, the live session may be integrated with a whiteboard or editable document that may be used to take notes, record any issues, or otherwise keep a record of the live session.

In embodiments, during guided review, the platform 110 may display data indicating, for certain variables, a mostly commonly used value or other statistics indicating what other parties typically/frequently/rarely select. For example, the platform 110 may indicate whether a particular value is far outside of a normal range, what an average value for the variable is, and/or the like.

In embodiments, during guided review, if the first party acceptable values include one or more modification strings and the second party acceptable values include one or more different modification strings (e.g., the first party values include at least one modification string that the second party rejected or modified, the second party values include an additional modification string that does not match any first party modification string, etc.), the platform 110 may use one or more machine learning (ML) and/or artificial intelligence (AI) techniques to assist the first party and the second party to come to agreement over the modification strings. For example, the platform 110 may generate a prompt including the first party modification string(s) and the second party modification string(s) and submit the prompt to a large language model or other AI model, which may analyze the differences between the modification strings, generate summaries of each modification string and/or the differences between the modification strings, generate suggested "compromise" modification strings that meet both party's needs based on the differences between the modification strings, and/or the like. Additionally or alternatively, the platform 110 may use one or more ML/AI models to compare the modification strings to each other and/or to a database of "market" strings (e.g., a set of modification strings that have been used by other parties, that are commonly used, etc.) to determine how similar each party's modification strings are, which party's modification string is closer to a "market" value, etc. For example, the platform 110 may use an embeddings model that tokenizes the modification string(s) and generates vector embeddings, which may be compared to the vector embeddings for other strings (e.g., using cosine similarity or other similarity methods). The platform 110 may also propose selection of a "market" string that is most similar to the first party's modification string and the second party's modification string. The platform may display the AI/ML outputs and associated metrics, such as the large language model outputs, the proposed market string, and/or the similarity scores, to one or both parties to promote an agreement.

In embodiments, during guided review, the platform 110 may update some variables automatically using formulas based on other variables. For example, if one value is an output of a formulas that takes another variable as input, the platform 110 may automatically update the output variable based on changes to the input variable.

At 307A, the platform 110 may perform additional guided reviews if agreement is not yet reached. The platform 110 may initially perform a guided review by the first party of the second party's values in a similar manner as described above for step 306. Specifically, a first party user may use device 120 to access a proposed value review page (e.g., as described above for step 306B) that presents the second party proposed values for each variable for which agreement has not yet been reached. The first party may then either accept the second party proposed value (e.g., the second party's preference 206 and/or acceptable alternative 208) or propose a new value. Additionally or alternatively, if agreement has not yet been reached on any modification strings, the first party may review and accept, reject, or propose changes to the second party modification strings. As above, after the first party user completes a proposed value review page (e.g., as described for step 306B), the first party may request and obtain approval via the platform 110 (e.g., as described for step 306D). The platform 110 may then store the updated first party data (as described for step 306E) and transmit the first party data back to the second party (as described for step 306F). Then, if agreement has not yet been reached on some or all of the negotiated variables and/or notification strings, the platform 110 may initiate another guided review by the second party of the first party's values. The platform 110 may proceed in this manner, performing as many additional guided reviews as necessary, until agreement is reached or either party stops negotiating/collaborating.

At step 307B, after a guided review by either party, the platform 110 may verify that agreement has been reached on all negotiated variables and modification strings. The platform 110 may then notify both parties that agreement has been reached. For example, the platform 110 may transmit emails to and/or update dashboards for both parties. In embodiments, the platform 110 may generate a signature link for each party and include the corresponding signature link in the email and/or dashboard for each party. The platform 110 may further create and store a document card 160 comprising the fields described above (e.g., agreed key variables 252, agreed location variables 254, agreed modification strings 256) in the party data 154 for both the first party and the second party. The platform 110 may then proceed to a signature phase 309 for adding signatures 260 to complete the document card.

Turning to FIG. 3C, at steps 309 and 311 each party may sign the document card after accessing corresponding signature pages. Although the figure illustrates a first party signing prior to the second party, either party may be able to sign first depending on when each party accesses its corresponding signature page and signs. Following the illustrated example where a first party signs first, at step 308 a first party user may access a signature link (e.g., from within an email notification, first party dashboard, etc.). At step 309A, the platform 110 may generate and transmit to device 120 a signature page. The signature page may include any comments made by first party users, each of the negotiated variables and/or modification strings, the document 152, and/or any other pertinent information (e.g., the entity blocks 164A, 164B, the party blocks 258A, 258B, etc.). In some cases, the first party user may re-assign the signing task to another user, which may result in a notification email being sent to the re-assigned user, where the notification email includes a link to the signature page. In embodiments, the signature page may allow the user to apply a signature via the page and/or via an integrated signature application such as DOCUSIGN or the like. At step 309B, the user may use the device 120 to apply the signature, which may be received by the platform 110.

At step 311, in response to the second party user accessing a corresponding signature link at 310, the platform 110 may generate and transmit a similar signature page for the signature at 311A and receive a signature at step 311B in a similar manner as described above.

At step 312, after receiving signatures from both parties, the platform 110 may store completed document cards (e.g., as illustrated at FIG. 2B, including signatures 260) in the party data 154 for both parties, thus concluding the negotiation/collaboration. Either party may access the completed document card to view a record of the negotiation/collaboration. The platform 110 may also transmit notifications that the negotiation/collaboration has concluded to both parties. The notification may include links to view the completed document card 160.

In some cases, at step 313 the platform 110 may prompt (or the second party may request) that the second party completes setup in a similar manner as described above for step 302. In other words, the second party may decide to set up an organization, one or more admin users, an entity block, a modification library, and/or one or more templates via the platform 110 as described above. In some cases, some of the data may be prefilled by the platform 110 (e.g., the entity block data may already have been entered by the second party at step 306).

After the process of FIGS. 3A-C, the first party or the second party may proceed to perform additional negotiations/collaborations with each other or with other parties (e.g., third parties, fourth parties, etc.). In these additional negotiations/collaborations, the various party data 154, such as templates, may be reusable, therefore substantially lowering effort of the first party and/or second party for future negotiations/collaborations. In other words, because the documents 152 are standardized and the parties may have already set up preferences 206 and/or acceptable alternatives 208 for each variable of a particular document using a template 156, the party may be able to complete future negotiations/collaborations involving the same document 152 with a minimum of effort. These benefits greatly improve the speed and efficiency of collaborative document editing and/or negotiation over the scope and content of a document (e.g., a legal contract and/or any other document).

Figure 4A:
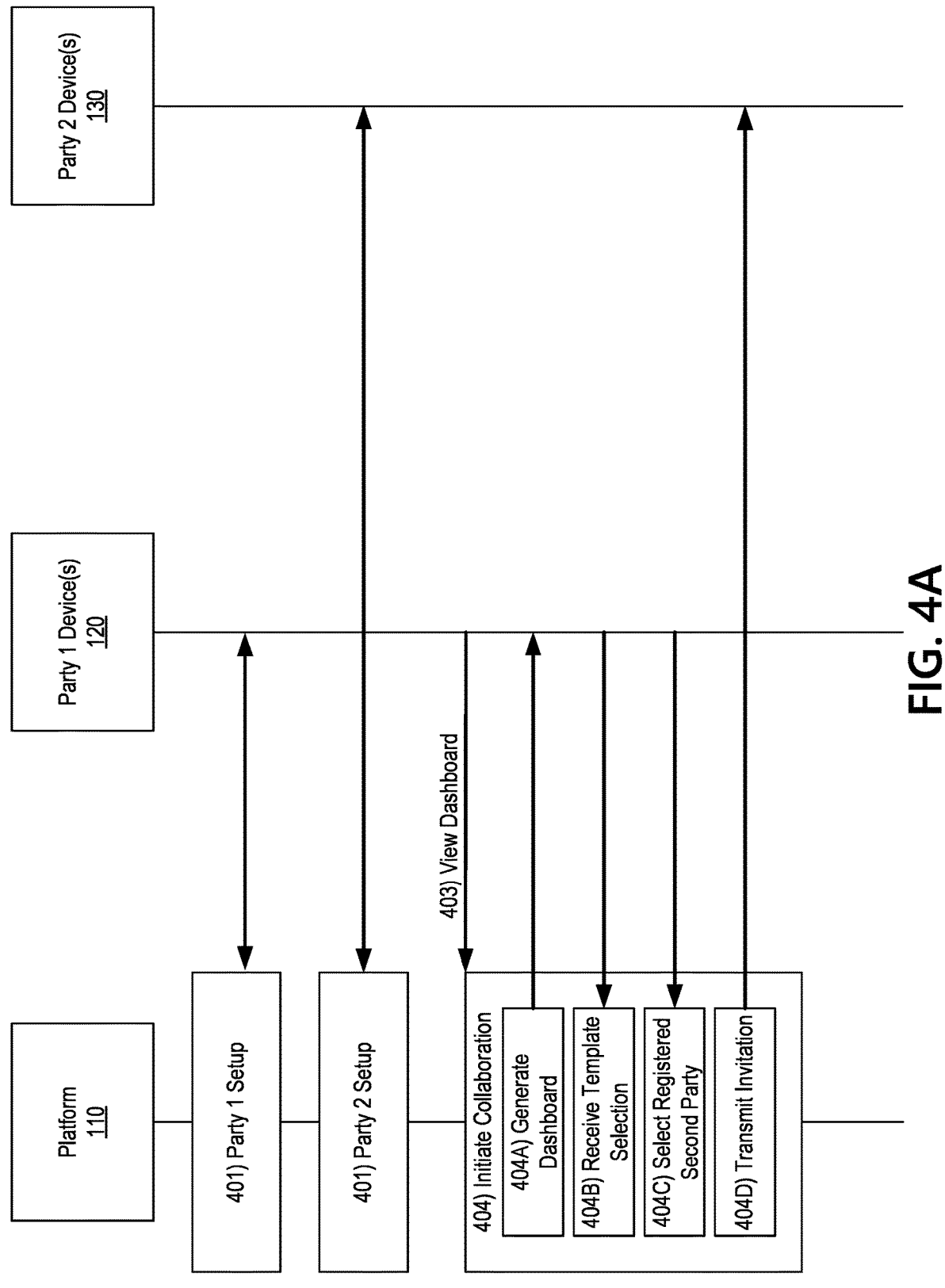
FIGS. 4A-B illustrate another example method for collaborative document editing according to some embodiments of the present disclosure.
Figure 4B:
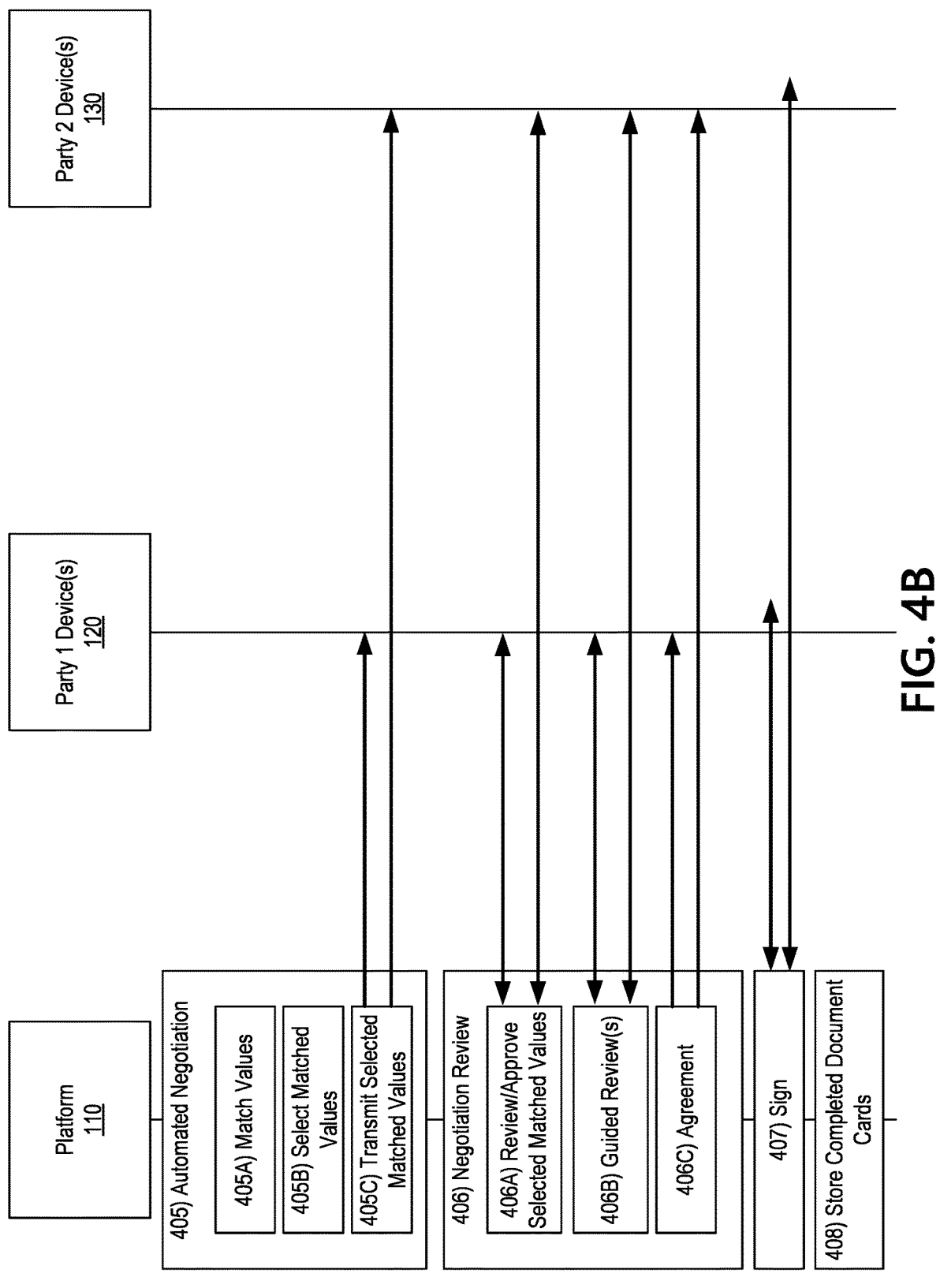

FIGS. 4A-B illustrate a method that may be executed by the platform 110 when both the first party and the second party have registered with the platform by completing setup prior to the initiate collaboration step. Because both parties may designate one or more proposed values (e.g., including one or more acceptable alternatives and/or a ranked list)

The platform 110 may be capable of executing both the methods of FIGS. 3A-C and FIGS. 4A-B depending on whether both parties have registered or not. In some cases, the method of FIGS. 3A-C may be used for an initial collaboration between two parties, and the method of FIGS. 4A-B may be used for subsequent collaborations between the same two parties (e.g., after the second party completes a setup process) and/or different parties that have completed a setup process.

At step 401, the first party may complete a setup process as described above for step 302. At step 402, a second party may complete a similar setup process as described above for step 302. In other words, both parties may interact with the platform 110 to set up a respective organization, perform admin configuration, entity block configuration, modification library configuration, and/or template configuration as described above. At step 403, a first party may view a dashboard via the platform 110 and initiate a collaboration (although the first party initiates in the illustrated example, either registered party may initiate a collaboration). At step 404A, the platform 110 may generate a dashboard as described above for step 304A. At step 404B, the party may then select a template as described above for step 304B.

At step 404C, the initiating party may select a counterparty (in the illustrated example, the first party selects a second party) via the dashboard generated by the platform 110. In embodiments, the platform 110 may display information about the registered counterparty prior to the initiating party contacting the registered counterparty. For example, the platform 110 may generate and transmit to device 120 a page providing details about the second party such as preferences of the second party (e.g. whether the second party has a configured template corresponding to the templated selected at step 404B, any preferences and/or acceptable alternatives defined by the second party template, any modification strings associated with the second party template, and/or the like. In embodiments, the second party may configure how much data may be viewed by other parties (e.g., whether other parties can view preferences and/or acceptable alternatives, modification strings, and/or any other information about a second party template). Thus, the platform 110 may provide more or less information about the second party to the first party at step 404C depending on a configuration provided by the second party.

At step 404D, the first party may transmit an invitation to collaborate to the second party. The invitation may be a notification (e.g., email) as described above for step 304C and/or may involve an update to the second party dashboard provided by the platform.

Turning to FIG. 4B, the platform 110 may then proceed with automated negotiation 405 based on the respective first party template 156 and second party template 156. At step 405A, for each negotiated variable (e.g., key variable, location variable, etc.), the platform 110 may determine whether there are any matching values. For example, if a first party template and a second party template define the same preference 206 for a key variable, the platform 110 may determine a match for that value. As another example, if a first party's preference 206 matches a second party's acceptable alternative 208 for a particular variable, the platform 110 may determine a match for that variable. In some cases, the platform 110 may detect multiple matches (e.g., the first party's preference may match an acceptable alternative for the second party and the second party's preference may match an acceptable alternative for the first party). In these cases, the platform 110 may detect multiple matches. The platform 110 may also determine whether any modification strings are matches or not.

At step 405B, the platform 110 may select one of the matches if there are multiple matches. The platform 110 may use various schemes to select the match. For example, if there are multiple matches from a ranked list 310 provided by both parties, the platform 110 may automatically select a higher ranked match (e.g., a value that is ranked first by one party and third by another party over a value that is ranked third by one party and second by another party). As another example, that platform may select a matching value that is listed as a preference 206 by at least one party over a matching value that is an acceptable alternative for both parties. As another example, the platform 110 may select a matching value that is listed relatively earlier in the parties' acceptable alternatives over a value that is listed later.

In embodiments, during the automated negotiation the platform 110 may use one or more AI/ML techniques as described above to reconcile and/or assisting in reconciling any differences in respective modification strings for the first party template and the second party template. For example, the platform 110 may generate a prompt including the first party modification string(s) and the second party modification string(s) and submit the prompt to a large language model or other AI model, which may analyze the differences between the modification strings, generate summaries of each modification string and/or the differences between the modification strings, generate suggested "compromise" modification strings that meet both party's needs based on the differences between the modification strings, and/or the like. Additionally or alternatively, the platform 110 may use one or more ML/AI models to compare the modification strings to each other and/or to a database of "market" strings (e.g., a set of modification strings that have been used by other parties, that are commonly used, etc.) to determine how similar each party's modification strings are, which party's modification string is closer to a "market" value, etc. For example, the platform 110 may use an embeddings model that tokenizes the modification string(s) and generates vector embeddings, which may be compared to the vector embeddings for other strings (e.g., using cosine similarity or other similarity methods). The platform 110 may also propose selection of a "market" string that is most similar to the first party's modification string and the second party's modification string. The platform may include the AI/ML outputs, proposed market string(s), and/or associated metrics as proposed matched values for the modification strings.

At step 405C, the platform 110 may transmit the selected matched values (and/or all of the matched values if there are multiple matches, proposed matched values generated using AI/ML techniques, etc.) to both parties. The platform 110 may transmit a notification (e.g., an email) to both parties, update both party's dashboards, and/or the like. In embodiments, the platform 110 may generate a link to a negotiation review page for continuing the negotiation and include the link in the notification and/or dashboard.

At step 406, the platform 110 may initiate a negotiation review for reviewing and approving any of the selected values from the automated negotiation and performing one or more guided reviews to reach agreement on all of the variables and/or modification strings. At step 406A, the platform may generate and transmit to device 120 and device 130 a page indicating the matched values and/or selected matched values for both parties. Using the page, a first party user of device 120 may approve or revert any or all of the automated selections and/or AI-proposed values on behalf of the first party and a second party user device 130 may approve or revert any or all of the automated selections and/or AI-proposed values on behalf of the second party. In some cases, step 406A may lead to an agreement on all variables and/or modification strings (e.g., if the platform found matching values and/or AI-proposed values for each variable and/or modification string and both parties accept the values). In these cases, the process may skip ahead to step 406C. In some cases (e.g., if one party reverts some or all of the matched values and/or if there is no matching value for one or more variables and/or modification strings), the platform 110 may proceed with one or more guided reviews at step 406B.

At step 406B, the platform 110 may perform the guided reviews as described above until agreement is reached. In embodiments, the platform 110 may initially perform a guided review by the second party (e.g., the party that did not initiate the collaboration/negotiation) of the first party's values in a similar manner as described above for step 306. Specifically, a second party user may use device 130 to access a proposed value review page (e.g., as described above for step 306B) that presents the first party proposed values for each variable for which agreement has not yet been reached. The second party may then either accept the first party proposed value (e.g., the first party's preference 206 and/or acceptable alternative 208) or propose a new value. Additionally or alternatively, if agreement has not yet been reached on any modification strings, the second party may review and accept, reject, or propose changes to the first party modification strings. As above, after the second party user completes a proposed value review page (e.g., as described for step 306B), the second party may request and obtain approval via the platform 110 (e.g., as described for step 306D). The platform 110 may then store the updated second party data (as described for step 306E) and transmit the second party data back to the first party (as described for step 306F). Then, if agreement has not yet been reached on some or all of the negotiated variables and/or notification strings, the platform 110 may initiate another guided review by the first party of the second party's values. The platform 110 may proceed in this manner, alternating parties and performing as many additional guided reviews as necessary, until agreement is reached or either party stops negotiating/collaborating.

At steps 406C, 407, and 408, the platform 110 may reach agreement, prompt and receive signatures from both parties, and store the completed document card as described above for steps 307B-312, thereby completing a collaborating editing/negotiation session.

FIG. 5 illustrates an example method that may be carried out by the platform 110. In embodiments, the platform may carry out the method of FIG. 5 as part of carrying out the method of FIGS. 3A-C and/or as part of carrying out the method of FIGS. 4A-B. In other words, the method of FIG. 5 includes operations that are common to both the methods of FIGS. 3A-C and FIGS. 4A-B.

At step 501, the platform 110 may receive a user selection of a standardized text document for collaborative editing, where the standardized text document includes a plurality of predefined variables and the standardized text document is stored in a library of standardized text documents maintained by the platform. At step 502, the platform may provide a first user interface configured to allow a first party to define one or more acceptable values for each of the plurality of predefined variables and to define one or more modification strings for modifying the standardized text document. At step 503, the platform may receive a first party set of values for the selected standardized text document, where the first party set of values comprises at least one first party acceptable value for each of the plurality of predefined variables and at least one modification string for modifying the text document. At step 504, the platform may provide a second user interface configured to allow a second party to define a second party set of values. At step 505, the platform may receive the second party set of values, where the second party set of values comprises a second party acceptable value for each of the plurality of key term variables and an indication of whether the at least one modification string is acceptable. At step 506, the platform may generate a final set of values for the standardized text document, where the final set of values are determined based on the first party set of values and the second party set of values. As part of generating the final set of values, the platform 110 may, for each of the plurality of predefined variables, determine a final value based on a match between the second party acceptable value and the at least one first party acceptable value, select the second party acceptable value as the final value if a) the second party acceptable value does not match the at least one first party acceptable value and b) the first party approves the second party acceptable value, or select a new value proposed by the first party as the final value if a) the second party acceptable value does not match the at least one first party acceptable value, b) the first party does not approve the second party acceptable value, and c) the second party accepts the new value proposed by the first party. As part of generating the final set of values, the platform 110 may, if the indication indicates that the at least one modification string is acceptable, include the at least one modification string in the set of values, and may, if the indication indicates that the at least one modification string is not acceptable, request and receive approval from the first party to omit or change the at least one modification string. At step 507, the platform may transmit the final set of values to the first party and the second party.

Conclusion

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through one or more machines that execute computer software, program codes, and/or instructions on one or more processors. The present disclosure may be implemented as a method on the machine(s), as a system or apparatus as part of or in relation to the machine(s), or as a computer program product embodied in a computer readable medium executing on one or more of the machines. In embodiments, the processor(s) may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through machine(s) that execute computer software in the role of a server, client, firewall, gateway, hub, router, switch, infrastructure-as-a-service, platform-as-a-service, or other such computer and/or networking hardware or system. The software may be associated with server(s) that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server(s) may provide interface(s) to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program(s) may be associated with client(s) that may include a file client, print client, domain client, internet client, intranet client and other variants such as secondary client, host client, distributed client and the like. The client(s) may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

All documents referenced herein are hereby incorporated by reference as if fully set forth herein.

The invention claimed is:

1. A method comprising:

receiving, by a platform, a user selection of a standardized text document for collaborative editing, wherein the standardized text document includes a plurality of predefined variables;

providing, by the platform, a first user interface configured to allow a first party to define one or more acceptable values for each of the plurality of predefined variables and to define one or more modification strings for modifying the standardized text document;

receiving, by the platform, a first party set of values for the standardized text document, wherein the first party set of values comprises:

at least one first party acceptable value for each of the plurality of predefined variables of the standardized text document; and at least one modification string for modifying text of the standardized text document, wherein the modified text of the standardized text document is not one of the plurality of predefined variables;

providing, by the platform, a second user interface configured to;

display at least a subset of the first party set of values; and allow a second party to define a second party set of values;

receiving, by the platform, the second party set of values, wherein the second party set of values comprises:

a second party acceptable value for each of the plurality of predefined variables;

an indication of whether the at least one modification string is acceptable;

generating, by the platform, a final set of values for the standardized text document, wherein the final set of values are determined based on the first party set of values and the second party set of values by:

for each of the plurality of predefined variables:

determining a final value based on a match between the second party acceptable value and the at least one first party acceptable value;

selecting the second party acceptable value as the final value if a) the second party acceptable value does not match the at least one first party acceptable value and b) the first party approves the second party acceptable value; or selecting a new value proposed by the first party as the final value if a) the second party acceptable value does not match the at least one first party acceptable value, b) the first party does not approve the second party acceptable value, and c) the second party accepts the new value proposed by the first party;

if the indication indicates that the at least one modification string is acceptable, including the at least one modification string in the final set of values; and if the indication indicates that the at least one modification string is not acceptable, requesting and receiving approval from the first party to omit or change the at least one modification string; and transmitting the final set of values to the first party and the second party.

2. The method of claim 1, wherein the platform receives the first party set of values prior to beginning the collaborative editing involving the first party and the second party.

3. The method of claim 1, wherein the platform stores the first party set of values for use in a future collaborative editing involving the first party and a third party.

4. The method of claim 1, wherein the final set of values parameterize the predefined variables of the standardized text document, thereby forming a final text document.

5. The method of claim 1, wherein the first party set of values comprises, for a first key term variable, a default acceptable value and a plurality of alternative acceptable values.

6. The method of claim 5, wherein the second user interface presents the default acceptable value and an option to accept the default acceptable value as the second party acceptable value.

7. The method of claim 6, wherein the second user interface further presents an option to view the plurality of alternative acceptable values and to select one of the plurality of alternative acceptable values as the second party acceptable value.

8. The method of claim 6, wherein the second user interface further presents an option to view the plurality of alternative acceptable values and to propose a different value as the second party acceptable value.

9. The method of claim 1, wherein the first party set of values comprises, for at least one of the predefined variables, a first party ranked list of acceptable values.

10. The method of claim 1, wherein the first party set of values and a third party set of values defined by a third party are received by the platform prior to beginning another collaborative editing involving the first party and the third party, wherein the method further comprises:

for at least some of the predefined variables, determining a plurality of matches between the first party set of values and the third party set of values; and selecting a highest-ranked match from the plurality of matches as the final value.

11. The method of claim 1, wherein the second party set of values further comprises a second modification string for modifying the standardized text document, the method further comprising:

including the second modification string in the final set of values based on receiving approval from the first party to include the second modification string.

12. The method of claim 1, wherein providing the first user interface comprises:

retrieving, by the platform, first party data corresponding to the standardized text document, wherein the first party data comprises a library of modification strings that may be used for modifying the standardized text document; and configuring the first user interface based on the first party data prior to providing the first user interface.

13. The method of claim 12, wherein the first party data specifies one or more standard modification strings that are usable by any party and one or more custom modification strings that are usable by the first party.

14. A system comprising:

one or more processors; and memory storing computer-readable instructions that, when executed by the one or more processors, cause the system to perform steps comprising:

receiving a user selection of a standardized text document for collaborative editing, wherein the standardized text document includes a plurality of predefined variables;

providing a first user interface configured to allow a first party to define one or more acceptable values for each of the plurality of predefined variables and to define one or more modification strings for modifying the standardized text document;

receiving a first party set of values for the standardized text document, wherein the first party set of values comprises:

at least one first party acceptable value for each of the plurality of predefined variables of the standardized text document; and at least one modification string for modifying text of the standardized text document, wherein the modified text of the standardized text document is not one of the plurality of predefined variables;

providing a second user interface configured to:

display at least a subset of the first party set of values; and allow a second party to define a second party set of values;

receiving the second party set of values, wherein the second party set of values comprises:

a second party acceptable value for each of the plurality of predefined variables;

an indication of whether the at least one modification string is acceptable;

generating a final set of values for the standardized text document, wherein the final set of values are determined based on the first party set of values and the second party set of values by:

for each of the plurality of predefined variables:

determining a final value based on a match between the second party acceptable value and the at least one first party acceptable value;

selecting the second party acceptable value as the final value if a) the second party acceptable value does not match the at least one first party acceptable value and b) the first party approves the second party acceptable value; or selecting a new value proposed by the first party as the final value if a) the second party acceptable value does not match the at least one first party acceptable value, b) the first party does not approve the second party acceptable value, and c) the second party accepts the new value proposed by the first party;

if the indication indicates that the at least one modification string is acceptable, including the at least one modification string in the final set of values; and if the indication indicates that the at least one modification string is not acceptable, requesting and receiving approval from the first party to omit or change the at least one modification string; and transmitting the final set of values to the first party and the second party.

15. The system of claim 14, wherein the system receives the first party set of values prior to beginning the collaborative editing involving the first party and the second party.

16. The system of claim 14, wherein the system stores the first party set of values for use in a future collaborative editing involving the first party and a third party.

17. The system of claim 14, wherein the final set of values parameterize the predefined variables of the standardized text document, thereby forming a final text document.

18. The system of claim 14, wherein the first party set of values comprises, for a first key term variable, a default acceptable value and a plurality of alternative acceptable values.

19. The system of claim 18, wherein the second user interface presents the default acceptable value and an option to accept the default acceptable value as the second party acceptable value.

20. The system of claim 14, wherein the first party set of values and a third party set of values defined by a third party are received by the system prior to beginning another collaborative editing involving the first party and the third party, wherein the steps further comprise:

for at least some of the predefined variables, determining a plurality of matches between the first party set of values and the third party set of values; and selecting a highest-ranked match from the plurality of matches as the final value.

* * * * *